US005864484A

United States Patent [19]

Harding

[11] Patent Number: 5,864,484

[45] Date of Patent: Jan. 26, 1999

[54] CUSHIONING CONVERSION MACHINE

[75] Inventor: Joseph James Harding, Mentor, Ohio

[73] Assignee: Ranpak Corp., Concord Township, Ohio

[21] Appl. No.: 597,127

[22] Filed: Feb. 6, 1996

Related U.S. Application Data

[63] Continuation-in-part of Ser. No. 279,149, Jul. 22, 1994, abandoned, and a continuation-in-part of Ser. No. 482,015, Jun. 7, 1995.

[51] Int. Cl.[6] ............ G06F 19/00; G06G 7/64; G06G 7/66

[52] U.S. Cl. ............ 364/471.01; 364/471.02; 364/471.03; 493/464; 493/477; 493/478; 493/967

[58] Field of Search ............ 364/471, 474.35, 364/473, 138, 130, 471.01, 471.02, 471.03; 355/204; 318/102, 561; 198/349.6; 493/352, 346, 407, 36, 22; 53/450; 65/29.1, 158

[56] References Cited

U.S. PATENT DOCUMENTS

| | | | |
|---|---|---|---|
| 1,569,569 | 1/1926 | Pels . | |
| 2,101,170 | 12/1937 | Engel | 271/76 |
| 2,882,802 | 4/1959 | Walker et al. | 93/1 |
| 2,924,154 | 8/1960 | Russel et al. | 93/1 |
| 3,074,543 | 1/1963 | Stanley et al. | 206/46 |
| 3,238,852 | 3/1966 | Schur et al. | 93/1 |
| 3,603,216 | 9/1971 | Johnson | 93/1 |
| 3,613,522 | 10/1971 | Johnson | 93/1 |
| 3,650,877 | 3/1972 | Johnson | 161/47 |
| 3,651,465 | 3/1972 | Law et al. | 340/149 |
| 3,655,500 | 4/1972 | Johnson | 161/104 |
| 3,695,133 | 10/1972 | Finke | 83/204 |
| 3,743,140 | 7/1973 | Sauerbrey | 222/63 |
| 3,799,039 | 3/1974 | Johnson | 93/1 |
| 3,899,166 | 8/1975 | Behn | 270/83 |
| 3,949,856 | 4/1976 | Weber et al. | 197/133 |
| 4,026,198 | 5/1977 | Otaviano | 93/1 |
| 4,061,326 | 12/1977 | Proudman | 270/69 |
| 4,071,911 | 1/1978 | Mazur | 364/900 |
| 4,085,662 | 4/1978 | Ottaviano | 93/1 |
| 4,109,040 | 8/1978 | Ottaviano | 428/129 |
| 4,174,237 | 11/1979 | Hemming, Jr. et al. | 156/64 |
| 4,237,776 | 12/1980 | Ottaviano | 493/382 |
| 4,247,289 | 1/1981 | McCabe | 493/386 |
| 4,548,286 | 10/1985 | Sashiki et al. | 177/1 |
| 4,557,716 | 12/1985 | Ottaviano | 493/464 |
| 4,585,381 | 4/1986 | Boyse | 410/154 |
| 4,619,635 | 10/1986 | Ottaviano | 493/36 |
| 4,650,456 | 3/1987 | Armington | 493/464 |
| 4,699,609 | 10/1987 | Komaransky et al. | 493/357 |
| 4,705,552 | 11/1987 | Liska et al. | 65/158 |
| 4,717,613 | 1/1988 | Ottaviano | 428/129 |
| 4,719,449 | 1/1988 | Cousslau | 340/347 |
| 4,750,896 | 6/1988 | Komaransky et al. | 493/357 |
| 4,781,090 | 11/1988 | Feldkamper et al. | 83/74 |
| 4,884,999 | 12/1989 | Baldacci | 493/439 |
| 4,922,687 | 5/1990 | Chow et al. | 53/479 |
| 4,924,506 | 5/1990 | Crossley et al. | 382/28 |

(List continued on next page.)

FOREIGN PATENT DOCUMENTS

| | | |
|---|---|---|
| 044565 | 7/1981 | European Pat. Off. . |
| 2741443 | 3/1979 | Germany . |
| 3315520 | 11/1983 | Germany . |
| 0274188 | 12/1989 | Germany . |

*Primary Examiner*—Reba I. Elmore
*Assistant Examiner*—Ramesh Patel
*Attorney, Agent, or Firm*—Renner, Otto, Boisselle & Sklar, P.L.L.

[57] ABSTRACT

A diagnostic system for performing real time diagnostics on a cushioning conversion machine includes a machine resident controller for controlling and monitoring operation of the cushioning conversion machine, a remote processor for performing diagnostic functions based on information retrieved from a cushioning conversion machine, and a communication device for facilitating real time communication between the machine resident controller and the remote processor.

27 Claims, 13 Drawing Sheets

U.S. PATENT DOCUMENTS

| | | | |
|---|---|---|---|
| 4,968,291 | 11/1990 | Baldacci et al. | 493/354 |
| 4,997,091 | 3/1991 | McCrea | 206/584 |
| 5,008,842 | 4/1991 | Nagai et al. | 364/551.01 |
| 5,016,182 | 5/1991 | Bergland et al. | 364/469 |
| 5,062,052 | 10/1991 | Sparer et al. | 364/473 |
| 5,088,370 | 2/1992 | Kondo et al. | 83/528 |
| 5,088,972 | 2/1992 | Parker | 493/352 |
| 5,109,347 | 4/1992 | Quick, Jr. et al. | 364/479 |
| 5,123,889 | 6/1992 | Armington et al. | 493/352 |
| 5,136,222 | 8/1992 | Yamamoto et al. | 318/568.2 |
| 5,173,352 | 12/1992 | Parker | 428/174 |
| 5,180,157 | 1/1993 | Helit et al. | 271/250 |
| 5,188,581 | 2/1993 | Baldacci . | |
| 5,211,620 | 5/1993 | Ratzel et al. . | |
| 5,213,867 | 5/1993 | Hutson, Sr. et al. | 428/126 |
| 5,252,899 | 10/1993 | Kawamura et al. | 318/568.1 |
| 5,303,585 | 4/1994 | Lichte . | |
| 5,322,477 | 6/1994 | Armington et al. | 493/346 |
| 5,387,173 | 2/1995 | Simmons, Jr. . | |
| 5,418,713 | 5/1995 | Allen . | |
| 5,439,730 | 8/1995 | Kelly et al. | 428/156 |
| 5,460,209 | 10/1995 | Jandura et al. . | |
| 5,468,208 | 11/1995 | Armington et al. | 493/352 |
| 5,483,052 | 1/1996 | Smith, III et al. . | |
| 5,517,404 | 5/1996 | Biber et al. | 364/138 |

CUSHIONING CONVERSION MACHINE

RELATED APPLICATION

This application is a continuation-in-part of co-owned U.S. patent application Ser. Nos. 08/482,015 now pending and 08/279,149 now pending, filed Jun. 7, 1995 and Jul. 22, 1994, respectively, both entitled, "Cushioning Conversion Machine" and incorporated herein by this reference.

FIELD OF THE INVENTION

This invention relates generally to a cushioning conversion machine which converts paper stock into cushioning material, and more particularly, to a cushioning conversion machine having a controller which can be used to control a number of different machines and to record and to perform machine diagnostics.

BACKGROUND OF THE INVENTION

In the process of shipping an item from one location to another, a protective packaging material is typically placed in the shipping container to fill any voids and/or to cushion the item during the shipping process. Some commonly used protective packaging materials are plastic foam peanuts and plastic bubble pack. While these conventional plastic materials seem to perform adequately as cushioning products, they are not without disadvantages. Perhaps the most serious drawback of plastic bubble wrap and/or plastic foam peanuts is their effect on our environment. Quite simply, these plastic packaging materials are not biodegradable and thus they cannot avoid further multiplying our planet's already critical waste disposal problems. The non-biodegradability of these packaging materials has become increasingly important in light of many industries adopting more progressive policies in terms of environmental responsibility.

These and other disadvantages of conventional plastic packaging materials have made paper protective packaging material a very popular alternative. Paper is biodegradable, recyclable and renewable; making it an environmentally responsible choice for conscientious companies.

While paper in sheet form could possibly be used as a protective packaging material, it is usually preferable to convert the sheets of paper into a low density cushioning product. This conversion may be accomplished by a cushioning conversion machine, such as those disclosed in U.S. Pat. Nos. 4,026,198; 4,085,662; 4,109,040; 4,237,776; 4,557,716; 4,650,456; 4,717,613; 4,750,896; and 4,968,291. (These patents are all assigned to the assignee of the present invention and their entire disclosures are hereby incorporated by reference.) Such a cushioning conversion machine converts sheet-like stock material, such as paper in multi-ply form, into low density cushioning pads or dunnage.

A cushioning conversion machine, such as those disclosed in the above-identified patents, may include a stock supply assembly, a forming assembly, a gear assembly, and a cutting assembly, all of which are mounted on the machine's frame. During operation of such a cushioning conversion machine, the stock supply assembly supplies the stock material to the forming assembly. The forming assembly causes inward rolling of the lateral edges of the sheet-like stock material to form a continuous strip having lateral pillow-like portions and a thin central band. The gear assembly, powered by a feed motor, pulls the stock material through the machine and also coins the central band of the continuous strip to form a coined strip. The coined strip travels downstream to the cutting assembly which cuts the coined strip into pads of a desired length. Typically, the cut pads are discharged to a transitional zone and then, either immediately or at a later time, inserted into a container for cushioning purposes.

By selectively controlling the gear assembly (i.e., by activating/deactivating its motor) by and the cutting assembly, a cushioning conversion machine can create pads of a variety of lengths. This feature is important because it allows a single machine to satisfy a wide range of cushioning needs. For example, relatively short pad lengths can be employed in connection with small and/or unbreakable articles, while longer pad lengths can be employed in connection with larger and/or fragile articles. Moreover, a set of pads (either of the same or different lengths) can be employed in connection with uniquely shaped and/or delicate articles, such as electronic equipment.

Presently, a variety of length-controlling systems are used to control pad length. For example, a manual system is available in which a packaging person manually activates the gear assembly (i.e., steps on a foot pedal) for a time period sufficient to produce a coined strip of the desired length. He/she then manually deactivates the gear assembly (i.e., releases the foot pedal) and activates the cutting assembly (i.e., simultaneously pushes two appropriate buttons on the machine's control panel) to cut the coined strip. In this manner, a pad of the desired length is created. Alternatively, the system is designed so that a manual deactivation of the gear assembly (i.e., release of the foot pedal) automatically activates the cutting assembly.

Another technique used to control pad length is a time-repeat system. In such a length-controlling system, a timer is electrically connected to the gear assembly. The timer is set for a period (i.e., seconds) which, based on an estimated gear velocity, corresponds to the desired length of the pad. The timer is set by trial and error to obtain the desired pad length. The time-repeat system is designed to automatically activate the gear assembly for the selected period and thereby, assuming the estimated gear velocity is constant, produce a coined strip of the desired length. The system then deactivates the gear assembly and, if the automatic cut feature is enabled, then activates the cutting assembly to cut the coined strip into a first pad of the desired length. Thereafter, the system automatically re-activates the gear assembly to repeat the cycle so that, if the timer has not been disabled, a multitude of pads of substantially the same length are continuously created.

A further available length-controlling system is a removal-triggered system. This system is similar to the time-repeat system in that it deactivates the gear assembly based on the setting of a timer. However, with the removal-triggered system, the gear assembly is not automatically reactivated. Instead, it is only reactivated when the cut pad is removed, either manually by the packaging person, mechanically by a conveyor or by gravity . Upon reactivation, another pad of the same length is produced unless the timer is disabled.

Yet another length-controlling system includes a length-selection system which allows a packaging person to select certain predetermined pad lengths. In such a system, a selection panel (e.g., a key pad) is provided with a plurality of length options (e.g., buttons) so that a packaging person can manually select the appropriate pad length. When a particular length option is selected, the gear assembly is automatically activated for a period of time (based on estimated gear velocity) corresponding to the selected pad length. At the expiration of this time period, the gear assembly is deactivated, and the cutter assembly is activated.

Due to the increased popularity of paper protective packaging material, manufacturers often employ a plurality of cushioning dunnage conversion machines with preset parameters to produce protective packaging for articles of different sizes and shapes. This arrangement often reduces setup time and allows a manufacturer to produce and ship out goods in a minimal amount of time. In addition, manufacturers now incorporate programmed controllers to control the operation of cushioning dunnage conversion machines. These controllers result in reduced manpower, more uniform products, lower production costs, less error, and a safer working environment.

The controllers operate by continuously monitoring its respective machine through employment of sensing circuits connected to the machine, which provide output signals to a pre-programmed processor to control the respective machine according to the manufacturer's specifications. Each different machine typically has a respective independent controller unique to that particular machine. Employing a different controller for each machine type often results in increased manufacturing costs and chances of error in manufacture, and complicates replacement and repair.

It would be desirable to provide a single controller which could operate a variety of machine types without substantial adjustments or modifications to the controller. Such a universal controller would be less expensive to manufacture and easier to maintain because if it failed a technician would simply replace the circuit board of the controller and install a new one. It would also be desirable for a controller to collect and to store diagnostic information and to perform enhanced and automated packaging functions.

SUMMARY OF THE INVENTION

The present invention provides a cushioning conversion machine having a universal controller suitable for use in a variety of different configurations of a cushioning conversion machine with little or no change required of the controller. The universal controller includes a number of output ports for controlling the function of the cushioning conversion machine regardless of the cutting assembly employed or the operation mode selected for the universal controller. The cushioning conversion machine preferably includes a controller which communicates with various sensors and measuring devices to greatly increase the information available to the controller for recording and aiding in diagnostic and other functions.

In accordance with one aspect of the invention, a cushioning conversion machine includes a feed assembly for feeding stock through the machine and converting it into a cushioning product, a cutting assembly for cutting the cushioning product and a universal controller which includes a plurality of sensing devices for sensing the occurrence of predetermined events, a plurality of output ports for controlling one of a plurality of possible cutting assemblies which may be employed with the cushioning conversion machine, a selector switch for selecting one of a plurality of control options, and a processor for controlling the employed cutting assembly in accordance with events detected by the sensing devices and the control option selected.

In accordance with another aspect of the invention, a cushioning conversion machine includes a plurality of cutting circuits, each cutting circuit for controlling the supply of electrical power to a cutting apparatus, a plurality of mode detection circuits for detecting an operating mode of the cushioning conversion machine and for generating mode signals indicative of the detected mode, and a processor for controlling the operation of the cushioning conversion machine in accordance with the mode signals, the processor generating control signals for controlling the supply of electrical power to at least one of a plurality of the cutting circuits.

In accordance with another aspect of the invention, a cushioning conversion machine for converting a sheet-like stock material into a dunnage product includes a frame having an upstream end and a downstream end, conversion assemblies, mounted on the frame, which convert the sheet-like stock material into a continuous strip of a dunnage product, a feeding assembly, mounted on the frame, for feeding the stock material through the conversion assemblies, a cutting assembly, mounted on the frame downstream of the conversion assemblies, which cuts the continuous strip of dunnage into a section of a desired length, and a controller for controlling operation of the feeding assembly and the cutting assembly, the controller including a selecting device for selecting the mode of operation of the feeding assembly and the cutting assembly, a processing device which generates control signals based on the selected mode of operation, and a controlling device which controls the feeding assembly and cutting assembly in accordance with the generated control signals.

In accordance with a further aspect of the invention, a cushioning conversion machine for converting a sheet-like stock material into a dunnage product includes a frame having an upstream end and a downstream end, conversion assemblies, mounted on the frame, which convert the sheet-like material into a dunnage product, a feeding assembly, mounted on the frame, for feeding the stock material through the conversion assemblies, and a controller for controlling operation of the feeding assembly, the controller including a selecting device for selecting the mode of operation of the feeding assembly, a processing device which generates control signals based on the selected mode of operation, and a controlling device which controls the feeding assembly in accordance with the generated control signals.

According to still another aspect of the invention, a cushioning conversion machine for converting a sheet-like stock material into a dunnage product includes a frame having an upstream end and a downstream end, conversion assemblies, mounted on the frame, which convert the sheet-like stock material into a continuous strip of a dunnage product, a feeding assembly, mounted on the frame, for feeding the stock material through the conversion assemblies, a cutting assembly, mounted on the frame downstream of the conversion assemblies, which cuts the continuous strip of dunnage into a section of a desired length, and a diagnostic device which monitors the operation of the machine, the diagnostic device including a sensing device for sensing the mode of operation of the feeding assembly and the cutting assembly, a processing device which determines improper operation of the feeding assembly and the cutting assembly for the sensed mode of operation and generates signals in accordance with such improper operation, and a displaying device which displays codes corresponding to the generated signals for improper operation.

In accordance with another aspect of the invention a cushioning conversion machine for converting a sheet-like stock material into a dunnage product includes a frame having an upstream end and a downstream end, conversion assemblies, mounted on the frame, which convert the sheet-like stock material into a dunnage product, a feeding assembly, mounted on the frame, for feeding the stock material through the conversion assemblies, and a controller/diagnostic device for controlling and monitoring operation of the feeding assembly, the controller/diagnostic device including a selecting device for selecting the mode of operation of the feeding assembly, a processing device which generates control signals based on the selected mode of operation and which determines machine status and improper operation of the feeding assembly for the selected mode of operation and generates signals in accordance with such machine status and improper operation, a controlling device which controls the feeding assembly in accordance with the generated control signals, and a displaying device which displays codes corresponding to the generated signals for machine status and improper operation.

According to another aspect of the invention, a cushioning conversion machine for converting a sheet-like stock material into a dunnage product includes a frame having an upstream end and a downstream end, conversion assemblies, mounted on the frame, which convert the sheet-like stock material into a continuous strip of a dunnage product, a feeding assembly, mounted on the frame, for feeding the stock material through the conversion assemblies, a cutting assembly, mounted on the frame downstream of the conversion assemblies, which cuts the continuous strip of dunnage into a section of a desired length, a code reader for reading a code printed on the stock material, and a controller which decodes information from the code read from the stock material and selectively controls the operation of the machine as a function of the information.

In accordance with yet another aspect of the invention, a cushioning conversion machine for converting a sheet-like stock material into a dunnage product includes a frame having an upstream end and a downstream end, conversion assemblies, mounted on the frame, which convert the sheet-like stock material into a continuous strip of a dunnage product, a feeding assembly, mounted on the frame, for feeding the stock material through the conversion assemblies, a cutting assembly, mounted on the frame downstream of the conversion assemblies, which cuts the continuous strip of dunnage into a section of a desired length, a probe for determining the packaging requirements of a particular container, and a controller which controls the feeding and cutting assemblies to produce the required sections of dunnage product for the container as determined by the probe.

According to another aspect of the invention, a cushioning conversion machine for converting a sheet-like stock material into a dunnage product includes a frame having an upstream end and a downstream end, conversion assemblies, mounted on the frame, which convert the sheet-like stock material into a dunnage product, a feeding assembly, mounted on the frame, for feeding the stock material through the conversion assemblies, and a controller/diagnostic device for controlling and monitoring operation of the feeding assembly, the controller/diagnostic device including a processing device which determines machine status of the machine and generates signals in accordance with such machine status, a memory device for storing such machine status, and a communication device for communicating such machine status to a remote processor.

According to another aspect of the invention, a cushioning conversion network includes a supervisory controller communicating with a plurality of cushioning conversion machines which convert sheet-like stock material into a dunnage product, each machine including a controller for controlling the operation of the machine in accordance with instructions received from the supervisory controller.

According to a further aspect of the invention, a cushioning conversion network includes a plurality of cushioning conversion machines which convert sheet-like stock material into a dunnage product, each machine including a controller for controlling the operation of the machine, the controller of each machine being linked to the controller of at least one other machine for communication between the controllers.

According to still a further aspect of the invention, a cushioning conversion network includes a supervisory controller linked to a plurality of cushioning conversion machines which convert sheet-like stock material into a dunnage product, the supervisory controller controlling the operation of each machine.

According to another aspect of the invention, a cushioning conversion machine for converting a sheet-like stock material into a dunnage product includes a frame having an upstream end and a downstream end, a stock material supply assembly, conversion assemblies, mounted on the frame, which convert the sheet-like stock material into a continuous strip of a dunnage product, a feeding assembly, mounted on the frame, for feeding the stock material through the conversion assemblies, a cutting assembly, mounted on the frame downstream of the conversion assemblies, which cuts the continuous strip of dunnage into a section of a desired length, and an assembly for measuring the length of stock material supplied from the stock supply assembly to the conversion assemblies.

According to a further embodiment of the invention, a cushioning conversion machine includes a frame, conversion assemblies which are mounted to the frame and which convert a stock material into a cushioning product, and a length measuring device which measures the length of the cushioning product as it is being produced, the conversion assemblies including a rotating conversion assembly, the angular movement of this assembly directly corresponding to the length of the cushioning product, the length measuring device being positioned to monitor the angular movement of the rotating conversion assembly and thus the length of the cushioning product.

According to still a further aspect of the invention, a diagnostic system for performing real time diagnostics on a cushioning conversion machine includes a machine resident controller for controlling and monitoring operation of the cushioning conversion machine, a remote processor for performing diagnostic functions based on information retrieved from a cushioning conversion machine, and a communication device for facilitating real time communication between the machine resident controller and the remote processor.

In general, the invention comprises the foregoing and other features hereinafter fully described and particularly pointed out in the claims, the following description and the annexed drawings setting forth in detail a certain illustrated embodiment of the invention, this being indicative, however, of but one of the various ways in which the principles of the invention may be employed.

DETAILED DESCRIPTION OF THE INVENTION

Figure 1:
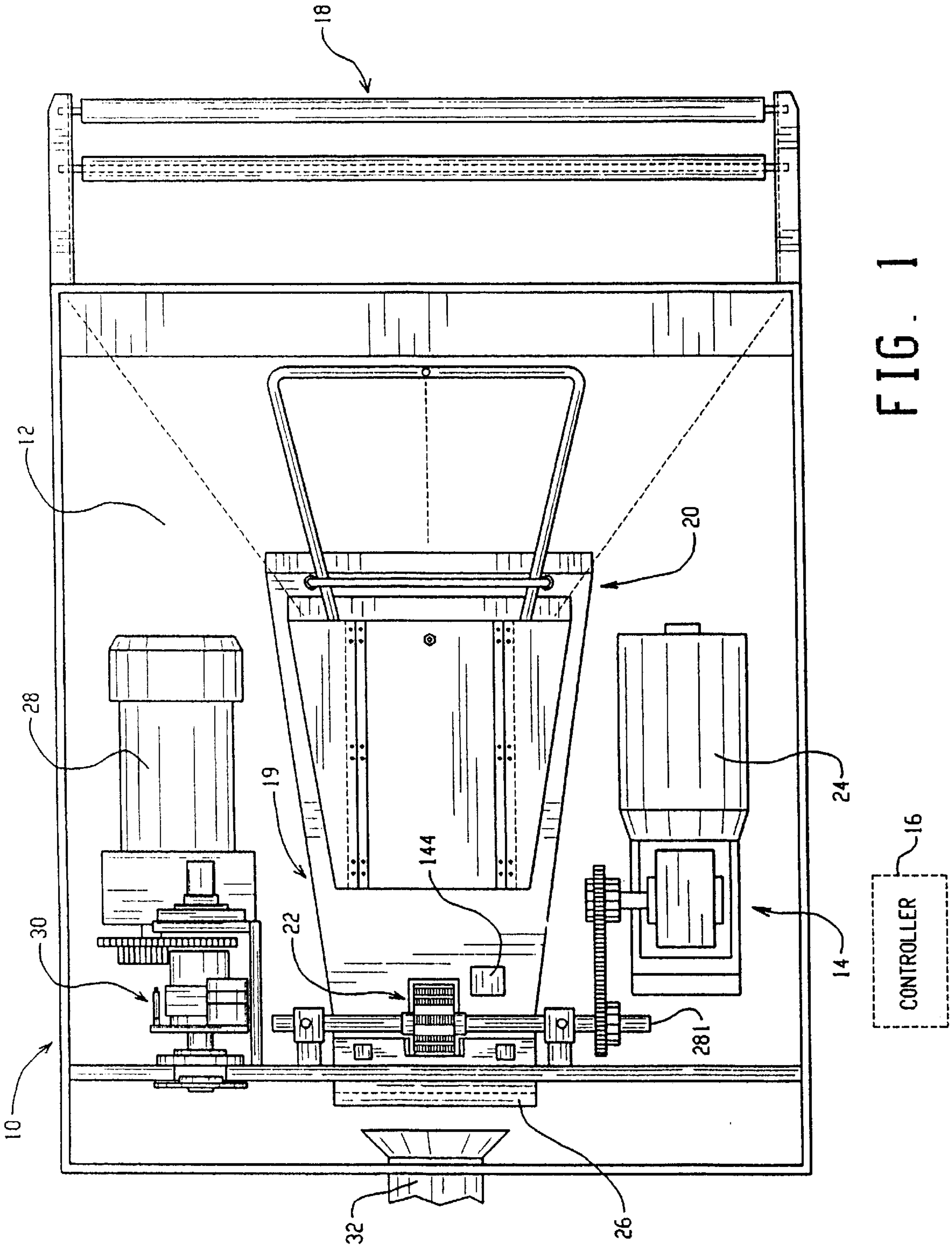
FIG. 1 is an illustration of a cushioning conversion machine.

With reference to the drawings and initially to FIG. 1, there is shown a cushioning conversion machine 10 including a frame 12 upon which the various components of a conversion assembly 14 are mounted and a controller 16 (illustrated schematically) for controlling the machine including the components of the cushioning assembly. The frame 12 includes a stock supply assembly 18 which holds a roll of stock for conversion by the conversion assembly 14 into a cushioning material. The conversion assembly 14 preferably includes a feed assembly 19 which includes a forming assembly 20 and a gear assembly 22 powered by a feed motor 24, a cutting assembly 26 powered by, for example, a cut motor 28 selectively engaged with the cutting assembly by an AC solenoid driven clutch 30 and a post cutting constraining assembly 32.

During the conversion process, the forming assembly 20 causes the lateral edges of the stock material to roll inwardly to form a continuous strip having two lateral pillow-like portions and a central band therebetween. The gear assembly 22 performs a "pulling" function by drawing the continuous strip through the nip of two cooperating and opposed gears of the gear assembly thereby drawing stock material through the forming assembly 20 for a duration determined by the length of time that the feed motor 24 rotates the opposed gears. The gear assembly 22 additionally performs a "coining" or "connecting" function as the two opposed gears coin the central band of the continuous strip as it passes therethrough to form a coined strip. As the coined strip travels downstream from the gear assembly 22, the cutting assembly 26 cuts the strip into sections of a desired length. These cut sections then travel through the post-cutting constraining assembly 32.

The controller 16 is preferably "universal" or capable of use in a number of differently configured cushioning conversion machines without requiring substantial change to the controller. Accordingly, one configuration of a universal controller 16 can thus be manufactured for a variety of different cushioning conversion machines. The assembly technician then need not adapt the controller 16 to a specific configuration of the cushioning machine, such as when one of the particular cushioning machines is adapted to use an air powered cutting assembly, a direct current powered solenoid cutting assembly, or a motor driven cutting assembly. The capability of the universal controller to control differently configured machines reduces assembly time, reduces assembly cost since the labor cost in specifically configuring a controller often outweighs the cost of assembling unused electrical components in the controller and reduces the possibility of assembly error. Moreover, repair of the machine is facilitated since training of the repair technician is minimized and since an inventory of universal controllers for use in a variety of cushioning machines can be maintained.

Figure 2:
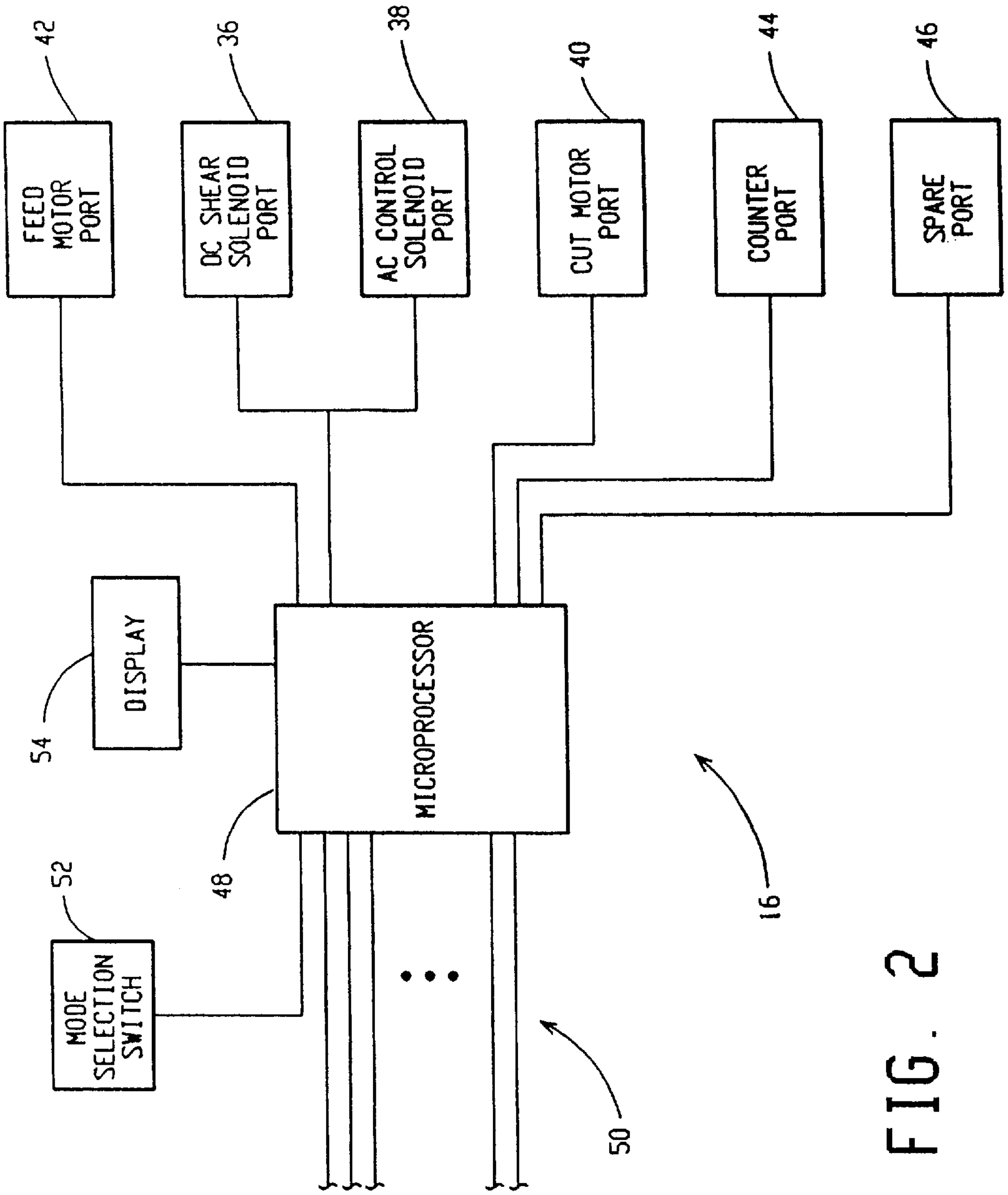
FIG. 2 is a block diagram of a universal controller for a cushioning conversion machine in accordance with the present invention.

An exemplary universal controller 16 is illustrated in FIG. 2 and includes a number of different output ports 36, 38, 40, 42, 44 and 46 devoted to providing a control signal from a microprocessor 48 to a DC shear solenoid, an AC control solenoid, a cut motor, a feed motor, a counter and a spare port, respectively, in accordance with a number of inputs 50. While the microprocessor 48 is illustrated and described herein as a single device, it is noted that microprocessor 48 may be embodied as a number of microprocessors or control units of the same type or as different microprocessors adapted for performing certain functions. The DC shear solenoid, controlled by the microprocessor 48 through DC shear solenoid port 36, powers a cutting blade positioned at the output of a cushioning conversion machine. When the DC shear solenoid is provided power by a control signal sent through the port 36, the solenoid actuates a cutting blade to force the blade through the dunnage to make a cut. One machine employing a cutting assembly powered by a DC solenoid is marketed by Ranpak Corp. under the name PadPak® and is disclosed in U.S. Pat. No. 4,968,291 which is incorporated herein by this reference.

The AC control solenoid port 38 controls an external AC solenoid which is typically used in conjunction with either an air-powered cutting assembly or a motor powered cutting assembly. When a cushioning conversion machine including the universal controller 16 employs an air-powered cutting assembly, the cutting assembly uses the AC solenoid to control the supply of pressurized air to an air cylinder which drives a cutting blade to shear off a section of dunnage fed through the machine. A cushioning conversion machine employing an air-powered cutting assembly is marketed under the name PadPak® by Ranpak Corp. and disclosed in U.S. Pat. No. 4,968,291 which has been incorporated herein above. The AC control solenoid port 38 may also be used to control an AC solenoid which acts to couple the direct drive cut motor 28 to the cutting assembly 26 via the clutch 30 to drive a cutting blade through a cutting stroke to cut a section of dunnage material fed through the machine. One such machine is marketed by Ranpak Corp. under the name AutoPad® and is disclosed in U.S. Pat. No. 5,123,889 which is also incorporated herein by this reference. In this embodiment of a cushioning conversion machine, the cut motor port 40 is used to supply a signal to the cut motor 28 to ensure that the cut motor is running when a cut is desired.

In any of the embodiments of a cushioning conversion machine described above, there is employed some means for moving the paper material through the machine to create the dunnage material. The PadPak® and AutoPad® machines referenced above employ the feed motor 24 which turns the enmeshed gears 22 that grip the paper stock and feed it through the machine where the appropriate conversion of the sheet-like stock to a dunnage product and the cutting of the dunnage product into appropriate lengths takes place. The universal controller 16 controls the feed motor 24 through the feed motor port 42. When it is desired that an appropriate length of paper be fed through the cushioning conversion machine by the feed motor 24, the microprocessor 48 sends a signal through the feed motor port 42 which causes power to be supplied to the feed motor for as long as the signal is present. When the microprocessor 48 has determined that the desired length of paper stock has been fed through the machine 10, the signal is disabled causing the feed motor 24 to stop and the supply of paper through the machine to stop. At this time the microprocessor 48 will determine, based on the position of the mode selection switch 52 and the condition of the input signals 50, whether to initiate a cut of the dunnage material fed through the machine 10, as is described more fully below.

Depending upon the embodiment of the cushioning conversion machine 10, the universal controller 16 may also use the counter port 44 to control a counter which keeps track of the machine usage or a spare port 46 which can be used to provide command signals to some other device.

While the universal controller 16 includes the output ports 36 through 46 for the control of the feed motor 24 and a variety of cutting assemblies, in most applications less than all of the ports will be used. For example, when the universal controller 16 is used to control a cushioning conversion machine having a DC shear solenoid powered cutting assembly, such as the PadPak® machine mentioned above, the DC shear solenoid port 36 is used while the AC control solenoid port 40 and the cut motor port 16 will not be used. When the universal controller 16 is used to control a machine 10 having an air powered cutting assembly, the AC control port 38 is employed to control the AC control solenoid, and the DC shear solenoid port 36 and the cut motor port 40 may be unused. Similarly, when the universal controller 16 is used in conjunction with a cushioning conversion machine using the cut motor 28 to actuate the cutting assembly 26, such as the AutoPad® machine mentioned above, the AC control solenoid port 38 and cut motor port 40 will be used to control and power the cutting assembly 26 while the DC shear solenoid port 36 will be unused. Preferably, the microprocessor 48 will more or less simultaneously cause appropriate signals to be sent to each of the respective output ports 36, 38, 40 regardless of the actual cutting assembly employed with a machine. In this way the microprocessor 48 does not need to be informed of this aspect of the configuration of the machine and the cutting assembly 26 connected to a port will thus be the one that responds to a signal sent from the microprocessor without the microprocessor having to distinguish which type of cutting assembly is employed.

Control of the various devices, such as the DC shear solenoid and the cut and feed motors, is performed by the microprocessor 48 in accordance with certain inputs 50 which are indicative of the operating condition of the cushioning conversion machine 10 and certain events which may have been sensed. The inputs 50 also include an indication of the operating mode for the cushioning conversion machine selected through the mode selection switch 52, such as a rotary switch. The mode selection switch 52 includes a number of settings corresponding to different operating modes, for example, keypad mode, electronic dispensing system mode, automatic cut mode, feed cut foot switch mode, and automatic feed mode. The mode setting of the controller 16 as well as a number of error signals may be displayed as alphanumeric codes on the display 54. For example, a display code of '1' may indicate to an operator that the machine 10 is operating in the automatic feed mode, while a display of "A" may indicate that an error has occurred in the buttons used to manually command a cut.

The keypad mode is for cushioning conversion machines which are equipped with a keypad through which an operator may input the length of each pad which she desires the machine to produce by depressing the appropriate key on the keypad. In this mode, regardless of the cutting assembly employed, the microprocessor 48 provides a signal to the feed motor through the feed motor port 42 to feed material through the machine for the appropriate length of time to provide dunnage of the length which the operator selected through the keypad. The keypad buttons are preferably pre-programmed so that each button corresponds to a particular cut length. For example, if an operator pushes button 12 on the keypad, and this button was preprogrammed to correspond to a length of 12 inches, the microprocessor 48 will signal the feed motor 24 and turn the feed motor on for a length of time that equates to 12 inches of dunnage material being fed out, and then the microprocessor will disable the feed motor. Upon completion of the dunnage material of the selected length being fed through the machine, the microprocessor 48 automatically commands the cutting assembly 26 employed, through the output ports 36, 38, and 40, to perform a cut. The microprocessor 48 then waits for the next key on the keypad to be depressed and repeats the process to produce a length of dunnage corresponding to the key depressed.

When the electronic dispensing system (EDS) mode setting is selected on the mode selection switch 52, an external electronic dispensing sensor is employed to detect the presence or absence of a dispensed length of dunnage material. The information as to the presence or absence of dunnage material is provided to the microprocessor 48 through one of the inputs 50. If the sensor detects that there is no dunnage material left at the cutting area of the machine, this information is passed to the microprocessor 48 which will send a signal to the feed motor 24 through the feed motor port 42 to feed out a certain length of material. The length of material to be fed through the machine 10 is determined by the setting of a thumb wheel, which is described below, as reported to the microprocessor 48 over one of the inputs 50. Once material is fed through the machine 10 and emerges at the cutting exit, the electronic dispensing sensor will report to the microprocessor 48 the presence of the dunnage material at the cutting exit of the machine. After the complete length of material has been fed through the machine 10 by the feed motor 24, the microprocessor 48 will wait a short period of time to allow the feed motor to stop and will then send a signal over the necessary output ports to command a cut to be performed by the attached cutting assembly 26. The electronic dispensing assembly will continue to report to the microprocessor 48 the presence of the dunnage material at the exit of the machine until the material is removed. Upon removal of the material, the sensor will report the removal to the microprocessor 48 through the inputs 50 whereupon the microprocessor will send a signal to the feed motor 24 again to feed another length of dunnage material through the machine and once the feed is complete the microprocessor will send a signal over the required output ports to cause the cutting assembly 26 to cut the material. This process will continue as long as the operator continues to remove the cut dunnage from the exit area of the machine.

The automatic cut mode selection on the selector switch 52 causes the microprocessor 48 to perform basically the same process set forth above for the EDS mode with the exception that an operator need not remove a length of dunnage material from the machine in order for the next length to be fed through the machine and cut. In this mode the microprocessor 48 commands the feed motor 24 through the feed motor port 42 to feed material through the machine for a length of time determined by the setting of the thumb wheel. Once the desired length of material has been fed through the machine, the microprocessor 48 will disable to signal to the feed motor 24, will wait a short period of time to allow the feed motor to stop and then will send the appropriate signals to the output ports 36, 38, 40 controlling the respective cut assemblies 26. The microprocessor 48 will cause predetermined lengths of material to be fed and cut by the machine continuously in this mode unless a predetermined number of lengths has been selected by the operator.

When the feed cut foot switch mode is selected on the mode selection switch 52, the control of the machine by the microprocessor 48 will be as instructed by an operator actuated foot switch. When an operator depresses the foot switch, an input indicating the fact is sent to the microprocessor 48 through one of the inputs 50. In response, the microprocessor 48 will send a signal to the feed motor 24 through the feed motor port 42 to feed material through the machine. The signal sent to the feed motor 24 by the microprocessor 48 will continue until the operator lets the pressure off of the foot switch at which time the microprocessor will disable the signal to the feed motor, will wait a short period of time to allow the feed motor to stop and then will send a signal to the output ports 36, 38, 40 operating the cutting assemblies 26 to cut the material fed through the machine.

The fifth mode of the mode selection switch 52 is the auto feed mode. In the auto feed mode the microprocessor 48 signals the feed motor 24 through the feed motor port 42 to feed a length of paper through the machine as determined by the position of the thumb wheel. After the appropriate length of dunnage material has been fed through the machine, the microprocessor will pause until a cut is manually requested. In this mode the operator must then instruct the microprocessor to signal the cut assembly to perform a cut. The operator preferably causes a cut to occur by manually depressing two cut buttons simultaneously. When the buttons have been depressed, both inputs are sent to the microprocessor 48 over the input lines 50 and, provided the buttons have been pushed near simultaneously, the microprocessor will send a signal through the appropriate outputs to the cutting assembly 26 employed on the machine to cut the material. After a cut has been completed, the microprocessor 48 will again send a signal to the feed motor 24 to cause the selected length of material to be fed through the machine and will then wait for the operator to instruct that a cut be made.

Figure 3:
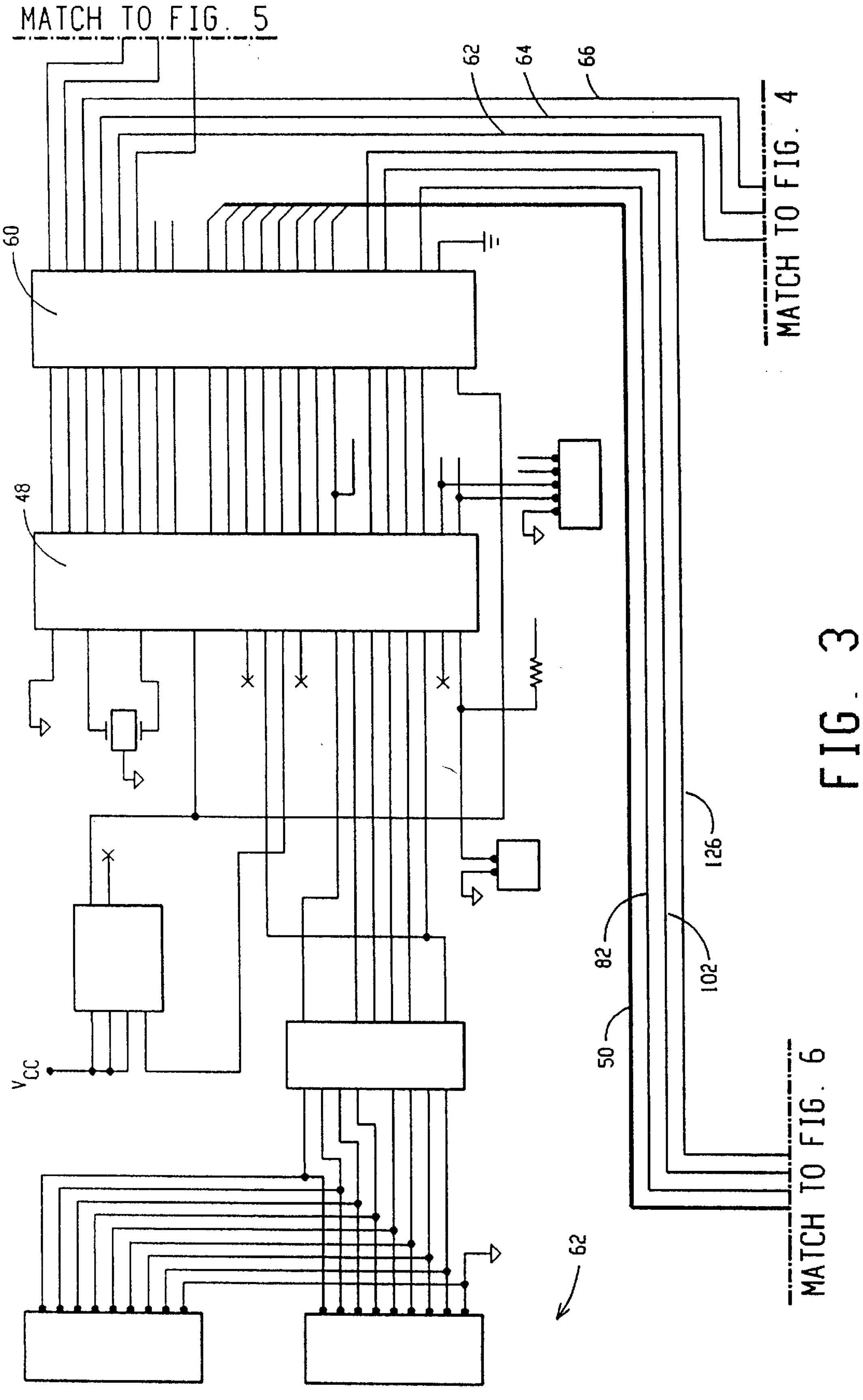
FIGS. 3 through 8 are electrical schematic diagrams of an embodiment of the universal controller.
Figure 4:
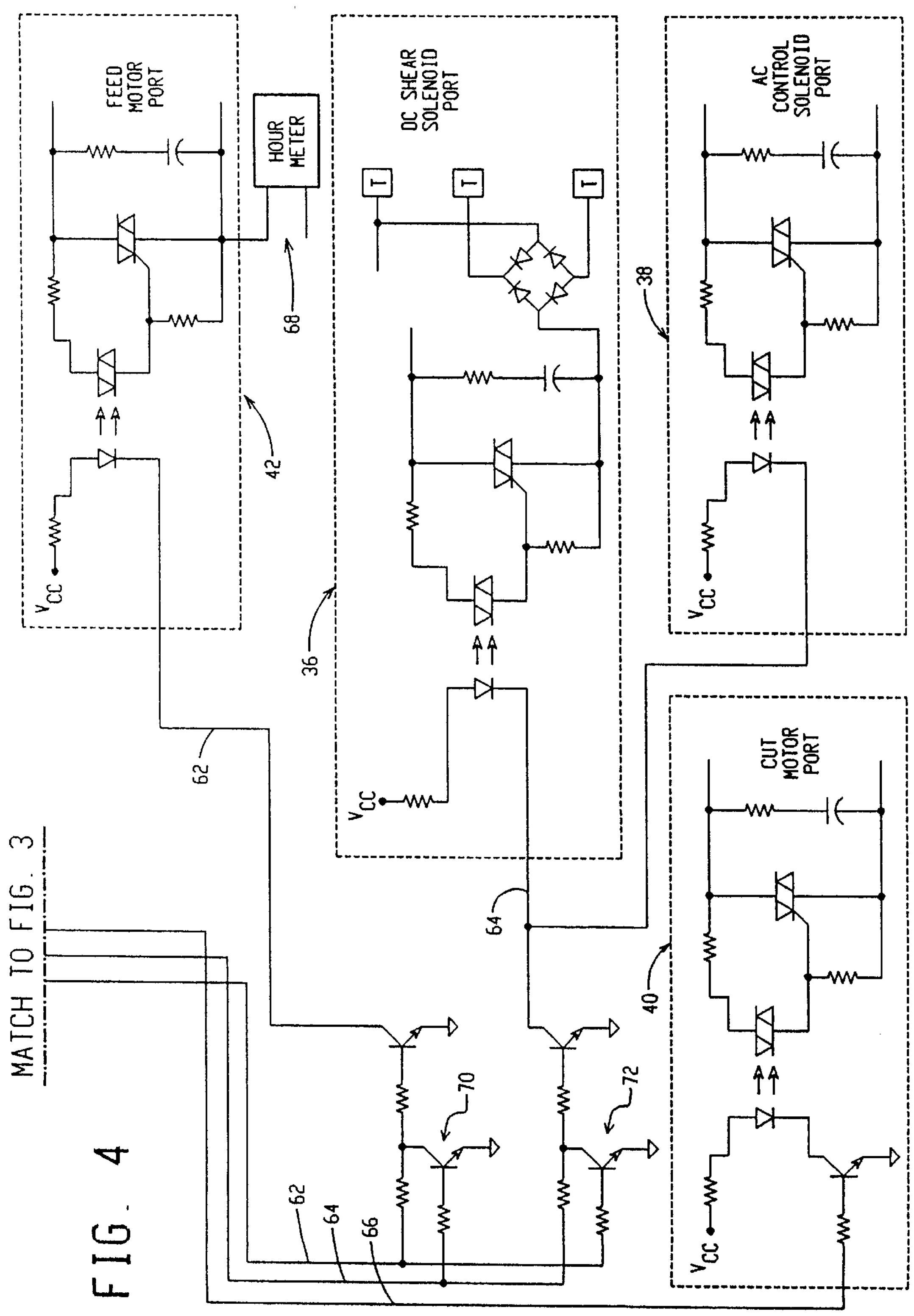
Figure 5:
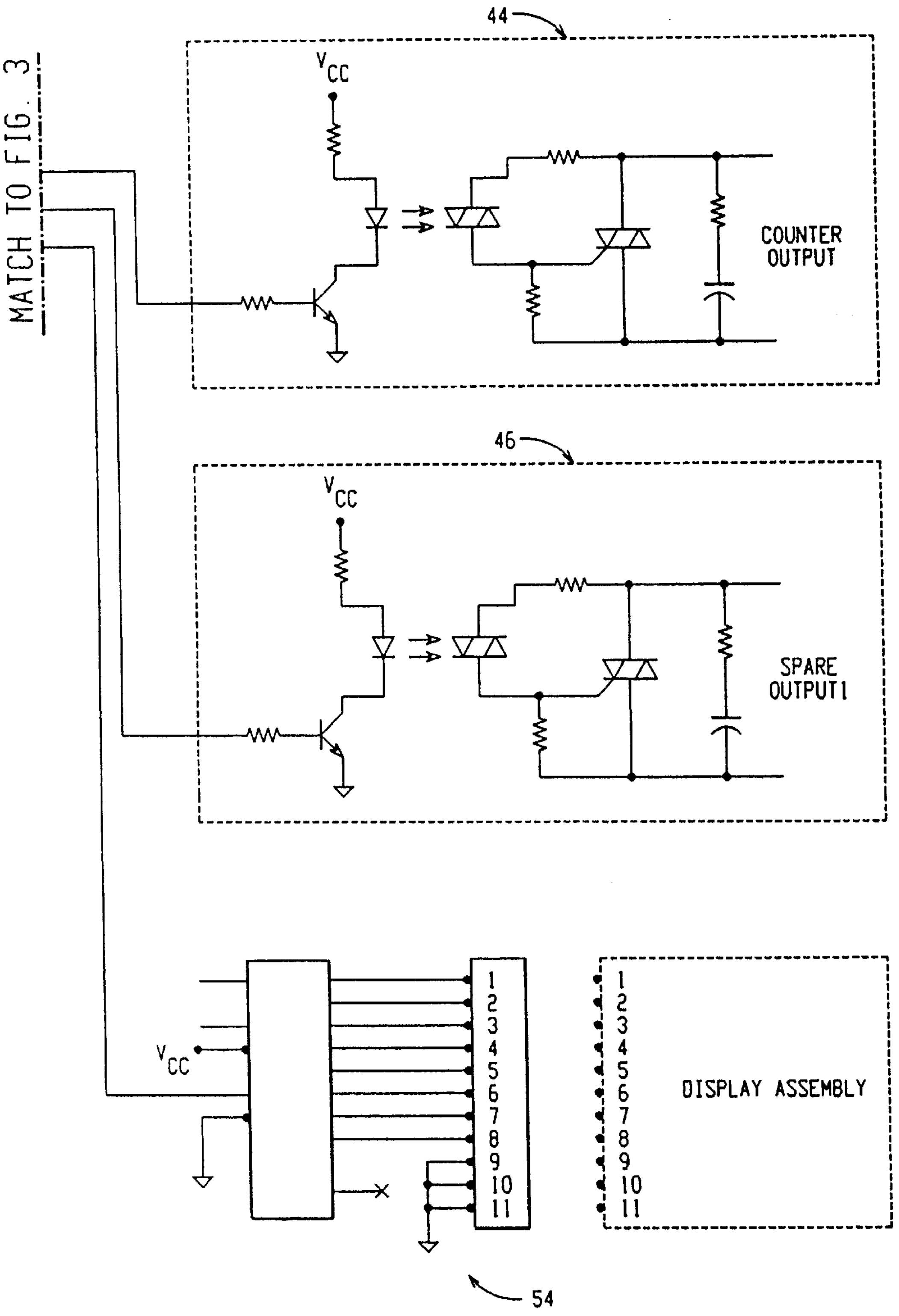

An embodiment of the universal controller 16 described above is shown in the schematic circuit diagram of FIGS. 3 through 8. Turning first to FIGS. 3 through 5, the interaction between the microprocessor 48 and output ports 36 through 46 is shown. The microprocessor 48 may be any one of a number of commercially available general purpose processing chips and preferably one suitable for convenient interface with the output ports 36 through 46 and the inputs 50 through a storage memory 60, such as a programmable peripheral device that may include ROM, RAM and I/O ports. The microprocessor 48 is also provided with keypad inputs 62 to which a keypad may be attached when the universal processor 16 is desired to operate in the keypad mode. To control the various output ports the microprocessor stores the appropriate signal value in a location in the memory 60 accessible to the appropriate output port. For example, to send a signal to the feed motor 24 through the feed motor port 42, the microprocessor 48 will place the desired signal value in a location in the memory 60 accessible by the line 62, to send a signal to the cut motor 28 through the cut motor port 40 the signal value will be placed in a location accessible by the line 66, and to send a signal to the DC shear solenoid through the DC shear solenoid port 36 or to the AC control solenoid through the AC control solenoid port 38 the signal value is placed in a memory location accessible by the line 64. When a control signal is sent to the feed motor port 42 to cause the feed motor 24 to run, an hour meter 68 may also be activated which keeps track of the run time of the cushioning conversion machine. To control the spare output port 46 or the counter port 44 (see FIG. 5), the microprocessor 48 places a signal value in a location in the memory 60 accessible by these ports or devices.

It is noted that since the cushioning conversion machine 10 in which the universal controller 16 is employed will be used with only one cutting assembly 26, the output ports which control a cutting assembly may be shared by different types of cutting assemblies, for example the AC control solenoid port 38 may control an air powered cutting assembly or the engagement clutch 30 of the cut motor 28 powered cutting assembly 26, or a single control line may control more than one output port as the control line 64 is shown to control both the DC shear solenoid port 38 and the AC control solenoid port 14. Further, while only a single cutting assembly 26 is employed by a machine 10 at a time, more than one control line may be used to control a single cutting assembly or to provide other control over the machine. In the instance where the cushioning conversion machine 10 is employed with a cut motor 28, both the control lines 64 and 66 are used to actuate a cut. The control line 66 instructs the cut motor 28 through the cut motor port 40 to run while the control line 64 instructs the AC control solenoid through the AC control solenoid port 38 to engage the clutch 30 coupling the cut motor 28 and the cutting blade assembly 26. The control lines 62 and 64 are also used cooperatively to ensure that the feed motor 24 is not operating when a cut has been initiated as this may cause the dunnage material to become jammed in the machine. A pair of transistors 70 and 72 are interconnected with the control lines 62 and 64 so that the feed motor 24 and a cutting assembly 26 cannot both be actuated simultaneously as the presence of a signal on one control line disables the other control line.

Figure 6:
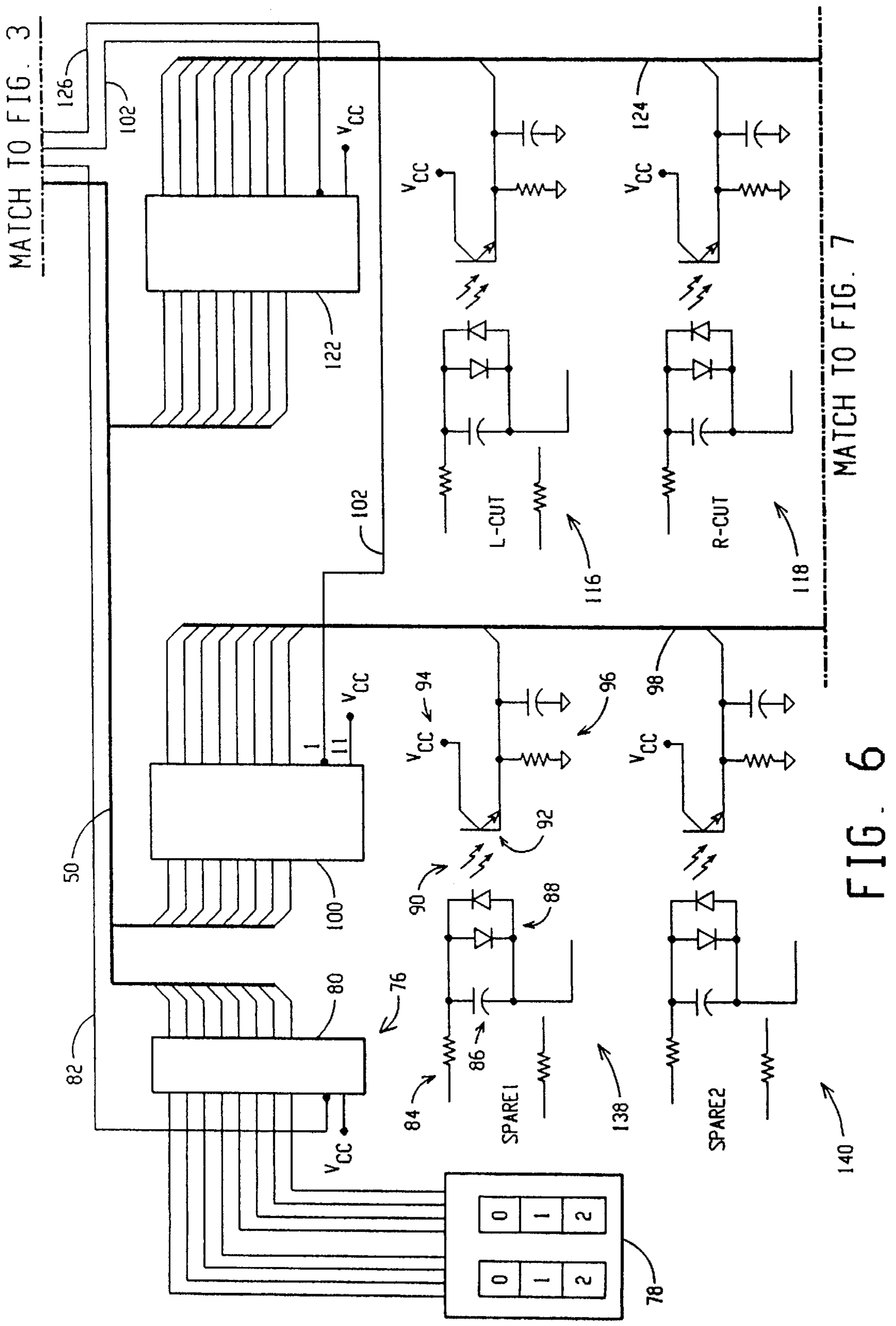
Figure 7:
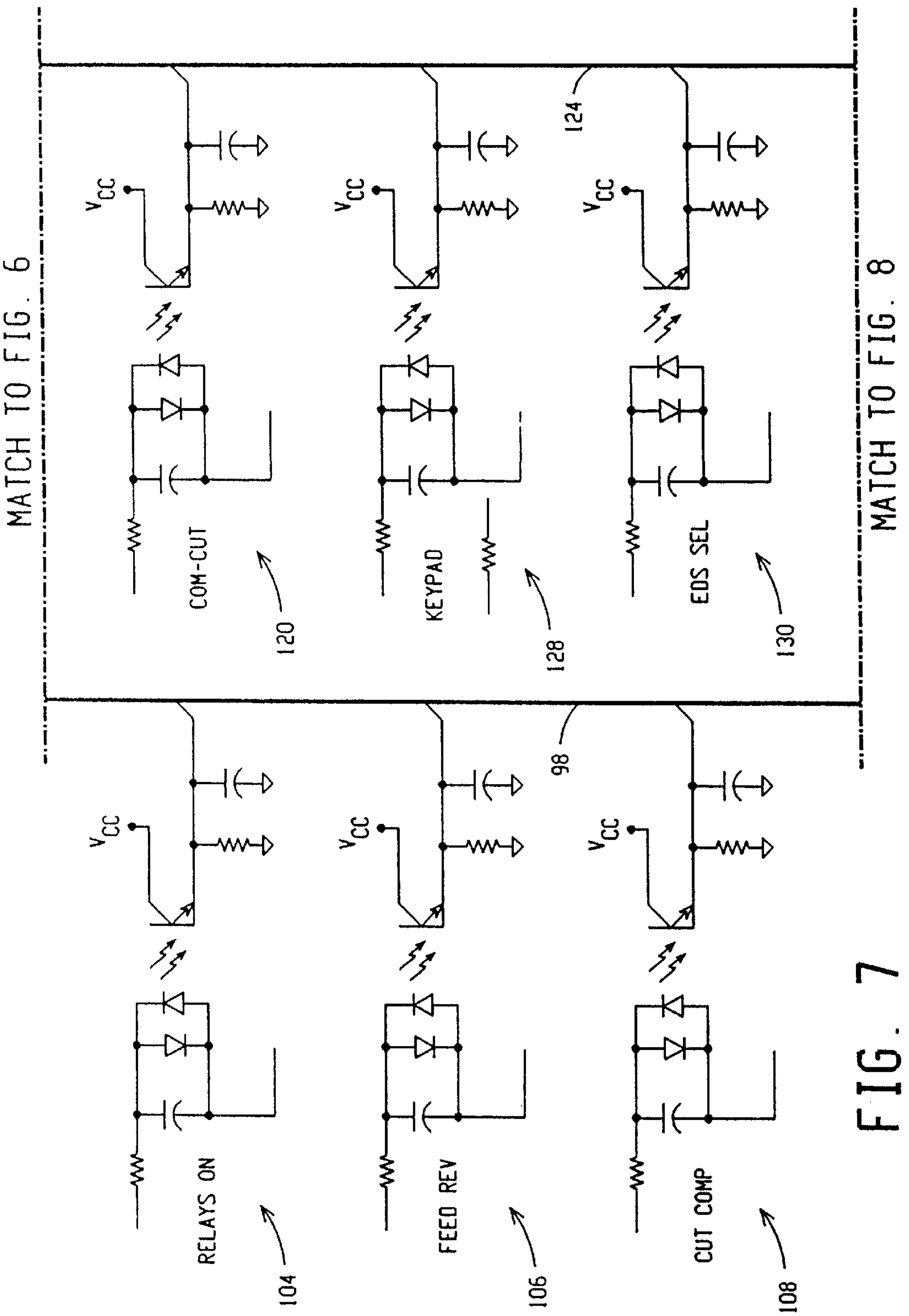
Figure 8:
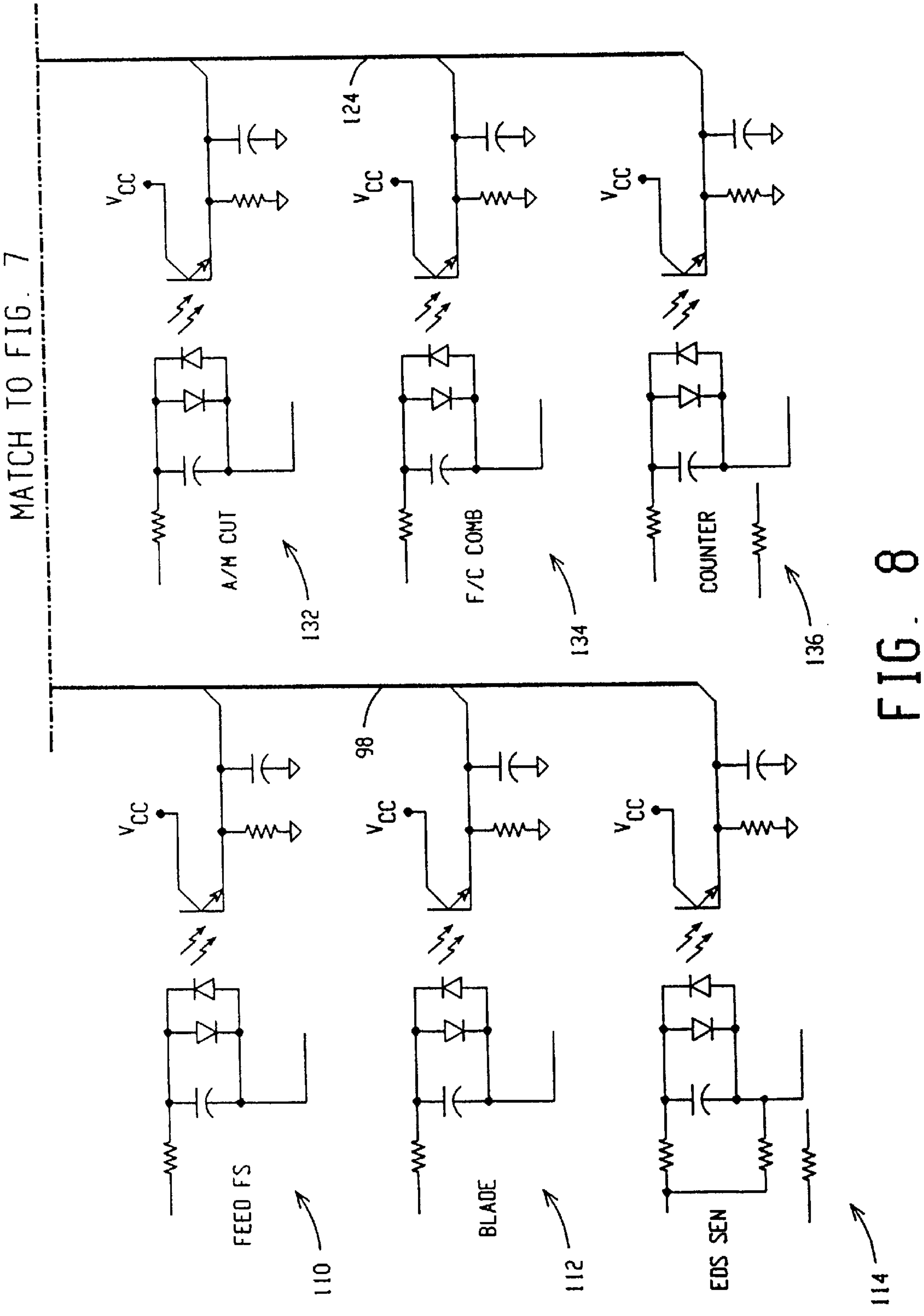

The inputs 50 to the microprocessor 48 are generated through a variety of circuits as shown in FIGS. 6 through 8. FIG. 6 illustrates the thumb wheel circuit 76 discussed above. A two-digit thumb wheel 78 is coupled to the input bus 50 via the bus interface 80 and control line 82 and allows the operator to select the time during which the microprocessor 48 will command the feed motor 24 via control line 62 and feed motor port 42 to run, and thus the length of dunnage material to be fed through the machine, during the EDS mode, automatic cut mode and the automatic feed mode. The selected feed length is sent to the microprocessor 24 over the input bus 50. Shown in FIGS. 6 through 8 are a number of current sensing circuits which provide additional inputs over the input bus 50 that inform the microprocessor 48, through the memory 60, of various operating events of the cushioning conversion machine, e.g. whether a cut has been completed, whether the foot switch is depressed or whether a cut button has been depressed, etc, as well as the selected mode of operation for the universal controller 16.

The current sensing circuits are each of a similar construction but sense unique occurrences. An exemplary current sensing circuit generally includes a contact 84 which receives current when a particular event specific to that sensing circuit occurs. When such an event occurs, current passes through the contact 84 to a capacitor 86 connected in electrical parallel to a pair of diodes 88 of an opto-coupler 90 arranged in reverse parallel. When current is detected across the diodes 88, indicating that the event which the particular sensing circuit is designed to sense, light from the diodes turns on the phototransistor 92 which causes the transistor to couple a constant voltage source 94, filtered by a resistor-capacitor filter 96, to an input 98 to the bus interface 100. The bus interface 100 provides the appropriate input to the memory 60 over the input bus 50 as controlled by control line 102.

Turning then to the specific sensing circuits, the sensing circuit 104 (RELAYS ON) detects whether the cushioning conversion machine has been reset and whether all safety switches are closed indicating that the cover, etc., of the machine is closed. The status of the detection is then sent to the microprocessor 48 via the memory 60 as an input on the input bus 50.

The circuit 106 (FEED REV) senses when an operator has pressed a reverse push button which allows the operator to reverse the rotation direction of the feed motor 24. The purpose of the feed reverse function is to provide a means for clearing a dunnage material jam. Oftentimes, the jammed dunnage can be cleared by simply reversing the feed motor and pulling the dunnage material away from the cutting assembly where jams most often occur. The status of this sensing circuit 106 is also reported to the microprocessor 48 over the input bus 50 through the memory 60.

The circuit 108 (CUT COMP) senses the status of a cut complete switch. Cutting assemblies using a DC solenoid to drive a cutting blade have an attribute of heating up quickly as power is continually applied to the solenoid. When such a solenoid heats up too much, it loses power and cannot cut as effectively as it can when in a cooler state. The cut complete switch detects whether a cut of the dunnage material has been completed. The sensing circuit 108 senses the status of the cut complete switch and reports the status to the microprocessor 48 so that the microprocessor can immediately discontinue the supply of power to the DC shear solenoid by sending an appropriate signal to the DC shear solenoid port 36 over the control line 64.

The position of the foot switch used when the universal controller 16 has been set to the feed cut foot switch mode is sensed by the sensing circuit 110 (FEED FS). The sensing circuit 110 senses the position of the foot switch and reports the position to the microprocessor 48. As discussed above, when in the foot switch mode, if the foot switch is depressed, the microprocessor 48 will signal the feed motor 24 through the feed motor port 42 and control line 62 to continually feed paper through the machine 10 while the foot switch is depressed. Upon the pressure on the foot switch being released, the sensing circuit will report to the microprocessor 48 that the foot switch has been released and the microprocessor will discontinue the signal to the feed motor causing the feed motor to stop and then the microprocessor will send out a signal to the output ports 36, 38 and 40 over the control line 64 and 66 prompting the attached cutting assembly 26 to perform a cut.

The circuit 112 (BLADE) senses the status of a blade switch. The blade switch detects whether the knife blade is in its normal at rest position or if the knife blade is at some other point, such as partially through a cut. If the knife blade is at its rest position, it is safe to feed paper through the machine 10, otherwise if the knife blade was partially through a cut and paper was fed, the paper could feed into the blade and jam the machine. The position of the knife blade as sensed by the circuit 112 is reported to the microprocessor 48 which will disable signals to the feed motor 24 until the circuit 112 has sensed that the knife blade has returned to its rest position.

The circuit 114 (EDS SEN) senses the presence or absence of dunnage material at the cutting assembly 26 area of the cushioning conversion machine 10 and reports the information to the microprocessor 48. When the universal controller 16 is in the EDS mode, the microprocessor 48 will automatically signal the feed motor 24 to feed a length of dunnage material determined by the thumb wheel circuit 76 (FIG. 6) through the machine 10 and signal the attached cutting assembly 26 to cut the material after the appropriate length has been fed whenever the circuit 114 senses that the last length of dunnage material fed has been removed from the exit area.

Continuing the description of the sensing circuits with reference to FIG. 8, the sensing circuits 116 (L-CUT), 118 (R-CUT) and 120 (COM-CUT) correspond to three push buttons located on the cushioning conversion machine 10 which allow for the operator to manually cause the cutting assembly 26 to cut the dunnage material fed through the machine 10. These circuits are recognized by the microprocessor 48 when the universal controller 16 is in the auto feed mode of operation. As a safety measure it is preferable that the microprocessor 48 detect an input from one of the circuits 116, 118 near simultaneously with the detection of an input from the circuit 120 indicating that the COM-CUT button and one of the L-CUT or R-CUT buttons have been pressed near simultaneously before the microprocessor signals the cutting assembly 26 attached to one of the output ports 36, 38 or 40 to perform a cut. The pressing of one of the push buttons by the operator causes the corresponding circuit 116, 118, 120 to provide an input over the input bus to the memory 60 via the bus interface 122, input line 124 and control line 126.

The sensing circuits 128, 130, 132 and 134 sense the position of the mode selection switch 52 and indicate whether the mode selector switch is set to the keypad mode (KEYPAD), the EDS mode (EDS SEL), the automatic cut mode (A/M CUT), or the feed cut foot switch mode (F/C COMB), respectively, and report such information to the microprocessor 48 over the input bus 50 to the memory 60. In the event that the mode selection switch 52 is not set to either the keypad mode, the EDS mode, the automatic cut mode, or the feed cut foot switch mode, the microprocessor 48 will default to operation in accordance with the automatic feed mode described above.

The sensing circuit 136 (COUNTER) senses when a predetermined number of lengths of dunnage material have been generated. When the machine is in the automatic feed mode, the operator sets the counter to the desired number of pads. When this number is reached, a contact closing in the counter is sensed and the circuit 136 informs the microprocessor 48 that the number of dunnage lengths has been reached and the microprocessor disables the automatic feed operation.

A number of spare sensing circuits 138 (SPARE1), 140 (SPARE2) as seen in FIG. 7, are also provided to enable the microprocessor 48 to perform expanded control functions based on additional inputs.

As noted above, the operational status of the machine may be indicated to the operator through an alphanumeric display 54 (See FIGS. 2 and 5). The alphanumeric display may be any of a variety of commercially available displays capable of interfacing with the microprocessor 48. The microprocessor 48 supplies the display 54 with information for display in accordance with information received over the input bus 50 or through other inputs which indicate to the microprocessor 48 the mode of operation of the machine as well as whether any errors have been detected in operation. Preferably, error codes displayed on the display 54 flash or blink to enhance the noticeability of the detected error.

Examples of errors which may be detected by the microprocessor 48 are jams in the feed or cutting assemblies 19, 26. To facilitate detection of such errors it is preferable that an encoder 144, such as an inductive proximity switch, be positioned proximate the coining gears of the gear assembly 22 to sense rotation and rotational speed of the gears and feed motor 24 (See FIG. 1), although other forms of detection means could be employed to sense the rotational speed of the various components of the feed assembly 19. If the microprocessor 48 determines that the rotational speed of the feed motor 24 has dropped below a certain threshold which is indicative of a paper jam in the feed assembly 19, such as in the gear assembly 22 or forming assembly 20, the microprocessor stops the feed motor 24 and displays an appropriate error code on the display 54 so the operator can attend to correction of the error.

To detect a jam in the cutting assembly 26, the microprocessor 48 may similarly monitor the position of the cutting blade as determined by the blade position detecting circuit 112 (See FIG. 7). If the blade is not in its rest position after a cut or does not return to its rest position after a period of time from the initiation of a cut cycle, the microprocessor 48 will disable the cutting operation of the machine and send an appropriate error code to the display 54 to inform the operator of the jam in the cutting assembly 26.

Figure 9:
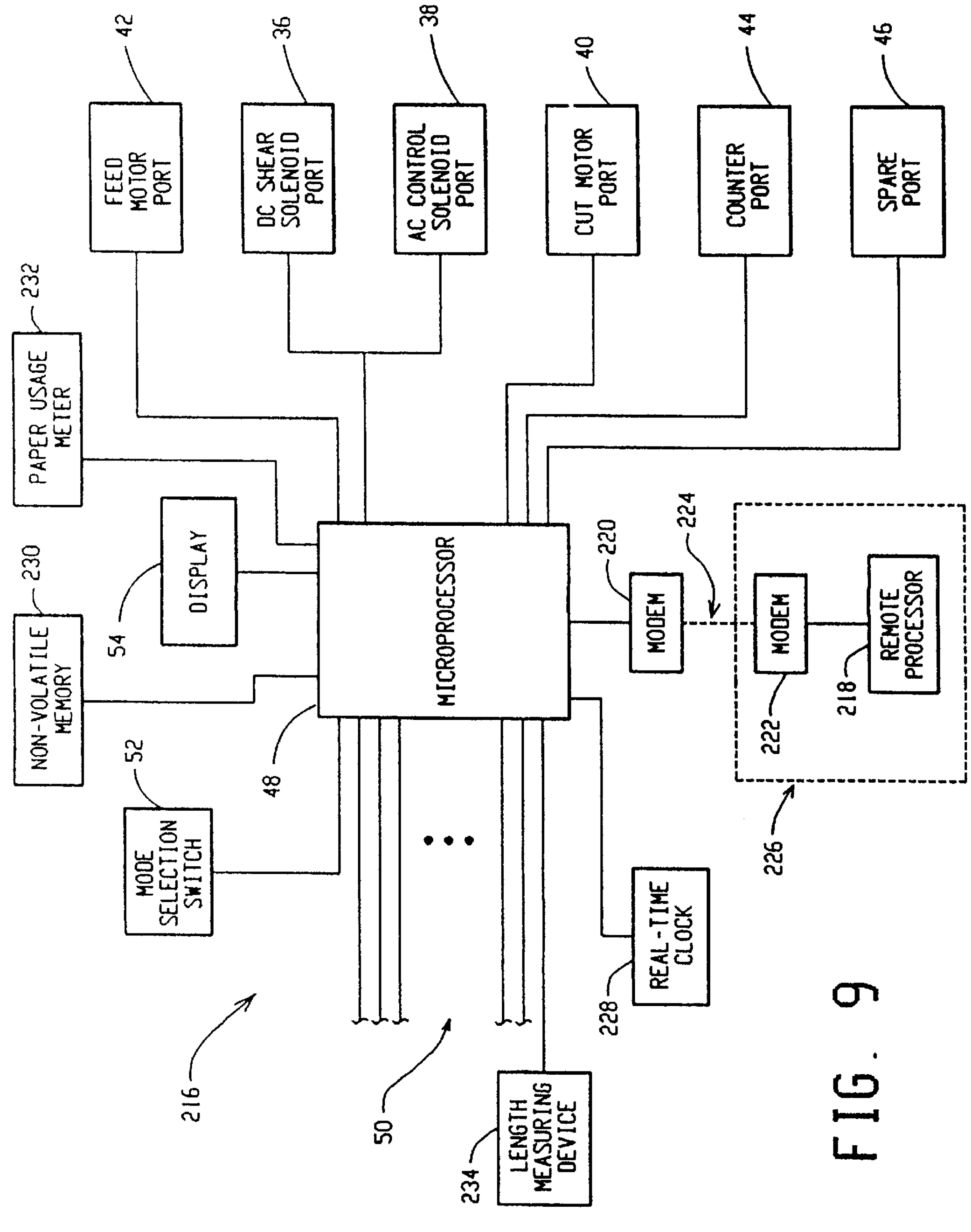
FIG. 9 is a block diagram of a controller for a cushioning conversion machine with enhanced diagnostic capabilities.

With reference to FIG. 9 there is shown a controller 216 for communication with a remote processor 218, such as a remote terminal or personal computer, through a pair of modems 220, 222, respectively, over a transmission line 224. (The remote processor 218 and corresponding modem 222 are designated as separate from the controller 216 by the dashed box 226 indicating a remote location, such as a service center.) The controller 216 is generally equivalent to the controller 16 described above relative to FIGS. 1 through 8. As is discussed above, the microprocessor 48 receives a number of inputs 50 corresponding, for example, to events detected by the current sensing circuits shown in FIGS. 6 through 8. The information sensed by the current sensing circuits includes the operational status of the machine, such as whether the machine is in the key pad mode, the electric dispensing mode, the automatic cut mode, etc., and further includes detection of machine errors, such as jams in the feed or cutting assemblies 19, 26, as well as the number of cuts that have been completed by the machine, the number of pads that have been produced by the machine and various other information.

The controller 216 may also be provided with a real-time clock 228 to permit the microprocessor 48 to record a number of timed events, for example the total time the machine is on, the total time the machine is active as opposed to the time devoted to maintenance, the time spent in each of the operational modes, the total time the feed motor or cut motor is running and the total time the feed motor is operating in reverse. The real-time clock 228 can also be used to time and date stamp occurrences of faults detected by the microprocessor 48.

All information received by the microprocessor 48 may be stored in a non-volatile memory 230 for later retrieval. When desired, the information stored in the non-volatile memory 230 may be accessed from a remote location 226 through communication between the remote processor 218 and the microprocessor 48 over the modems 220 and 222. The modems 220 and 222 may be conventional commercially available modems communicating over a telephone link 224 through conventional communications protocols as would be appreciated by those skilled in the art.

The information stored in the non-volatile memory 230 of the controller 216 may be automatically downloaded to the remote processor 218 at pre-planned timed intervals, for example, at the end of a day, or the end of a week. Alternatively, a service person at the remote location 226 can instruct the microprocessor 48 through the connection with the remote processor 218 via the modems 220 and 222 to download the information stored in the non-volatile memory 230 to the remote processor 218 as desired. Further, the connection between the remote processor 218 and the microprocessor 48 allows a service person to view in near real-time the status of all of the machine inputs 50, corresponding to the sensors and other inputs described above, while the machine is running. This enables the service person to diagnose effectively errors in the machine 10 since the service person is able to look at the inputs 50 as an error is occurring. The information downloaded to the remote processor 218 from the non-volatile memory 230 can also be used to schedule maintenance for the machine and to perform billing functions in instances where a customer is charged for use of the machine 10 based on its operating time, on the amount of paper fed through the machine, or on the length or number of pads produced by the machine.

In instances where a service person is at the site of the cushion conversion machine 10 it is also possible to access the non-volatile memory 230 through the same port provided for communication with the remote processor 218. In such a case instead of the modem 220 being connected to the microprocessor 48, a personal computer or other terminal may be connected to the microprocessor 48 for access to the information stored in the non-volatile memory 230. This allows a service person more access to the informational inputs 50 to the microprocessor 48 during servicing of the machine.

The microprocessor 48 resident in the cushioning conversion machine and the remote processor 218 can also function as a real time diagnostics system for the cushioning conversion machine by utilizing the modems 220 and 222 and the transmission line 224 to provide real time or near real time communication between the microprocessor and the remote processor. Near real time communication permits an operator at a central location, such as a servicing or manufacturing location 226, to obtain operational information on the performance of a cushioning conversion machine as the machine is operating. The machine information may be used as a preventative measure to determine if the machine is functioning properly or is in need of preventive maintenance. For example, if the remote processor 218 determines based on information received from the microprocessor 48 in real time that a motor runs excessively long or draws excessive current following a certain command from the microprocessor, the remote processor can infer that the motor is excessively worn and schedule a replacement before the motor fails. The machine information may also be used to diagnose or correct machine problems, as well as to determine if the machine is being operated correctly by an operator.

Some types of information which the remote processor 218 can receive from the machine microprocessor 48 include the status of any machine input, such as the operation mode of the machine, any keypad inputs, cut complete signals, operation of the footswitch or cut buttons, as well as other inputs received by the microprocessor indicating the machine operation. The microprocessor 48 may also provide information to the remote processor 218 relating to control commands or instructions produced by the microprocessor, including outputs to any of the ports, such as the feed motor port 42, the cut motor port 40 or the solenoid ports 38, 40. The remote processor 218 can also access, through the microprocessor 48, any of the machine RAM locations or the non-volatile memory 230 to provide an in depth view of the functioning of the machine and to analyze whether the microprocessor is receiving and processing data correctly.

Aside from requesting information from the microprocessor 48, the remote processor 218 can also provide inputs to the microprocessor to instruct the microprocessor to execute a predetermined test or the remote processor may change values in the microprocessor accessible RAM to monitor the functioning of the cushioning conversion machine in accordance with desired inputs.

Consequently, a skilled servicing technician at a central location can follow the operation of a remote cushioning conversion machine in real time or near real time as the machine is operating to allow the servicing technician to readily ascertain the functioning of the machine and to correct errors remotely, to recommend different operating guidelines to an operator or to aid a technician actually working with the machine in diagnosing and correcting problems in the machine.

Figure 10:
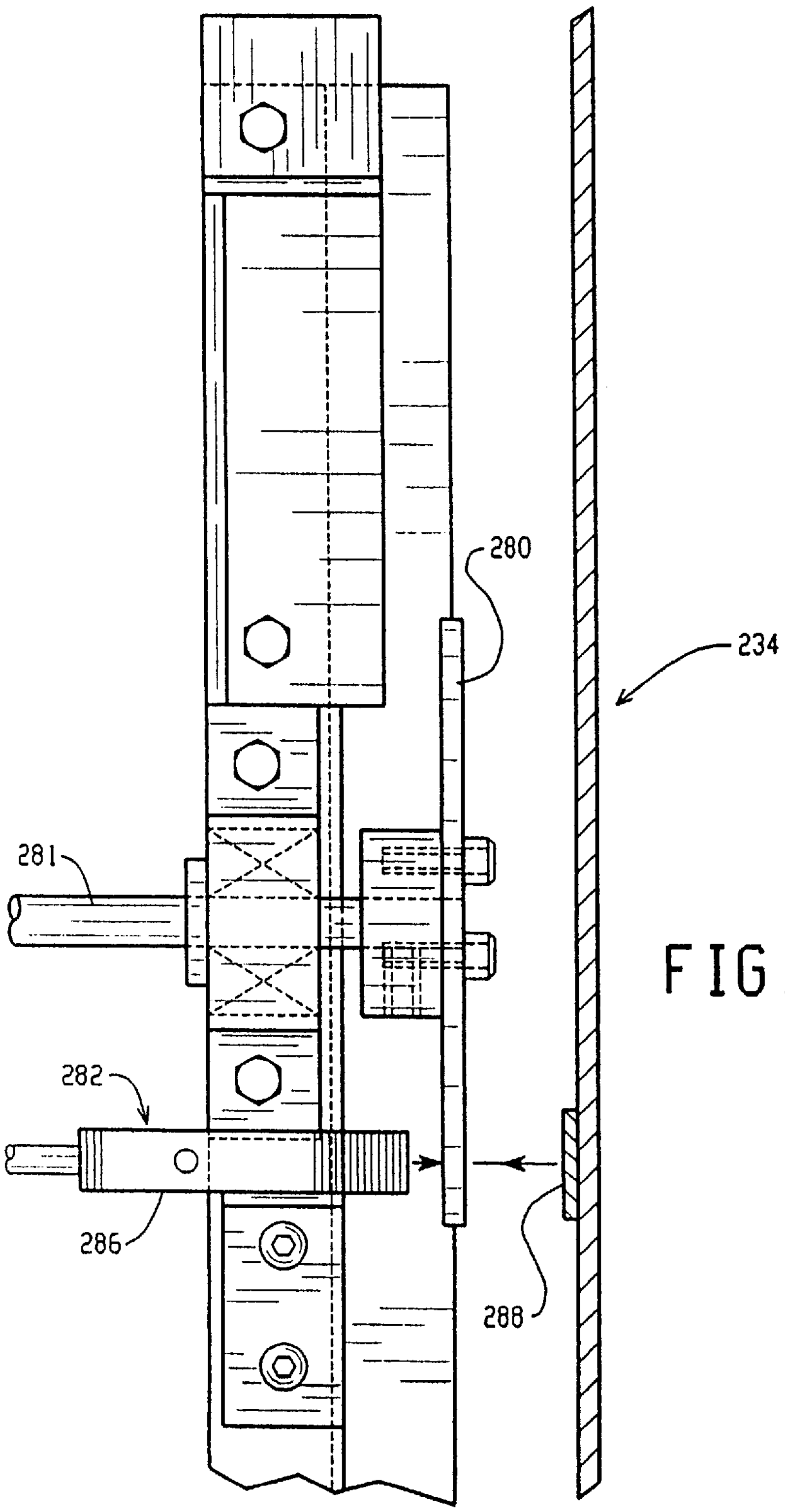
FIG. 10 is a front view of a length measuring device and other relevant portions of the cushioning conversion machine.
Figure 11:
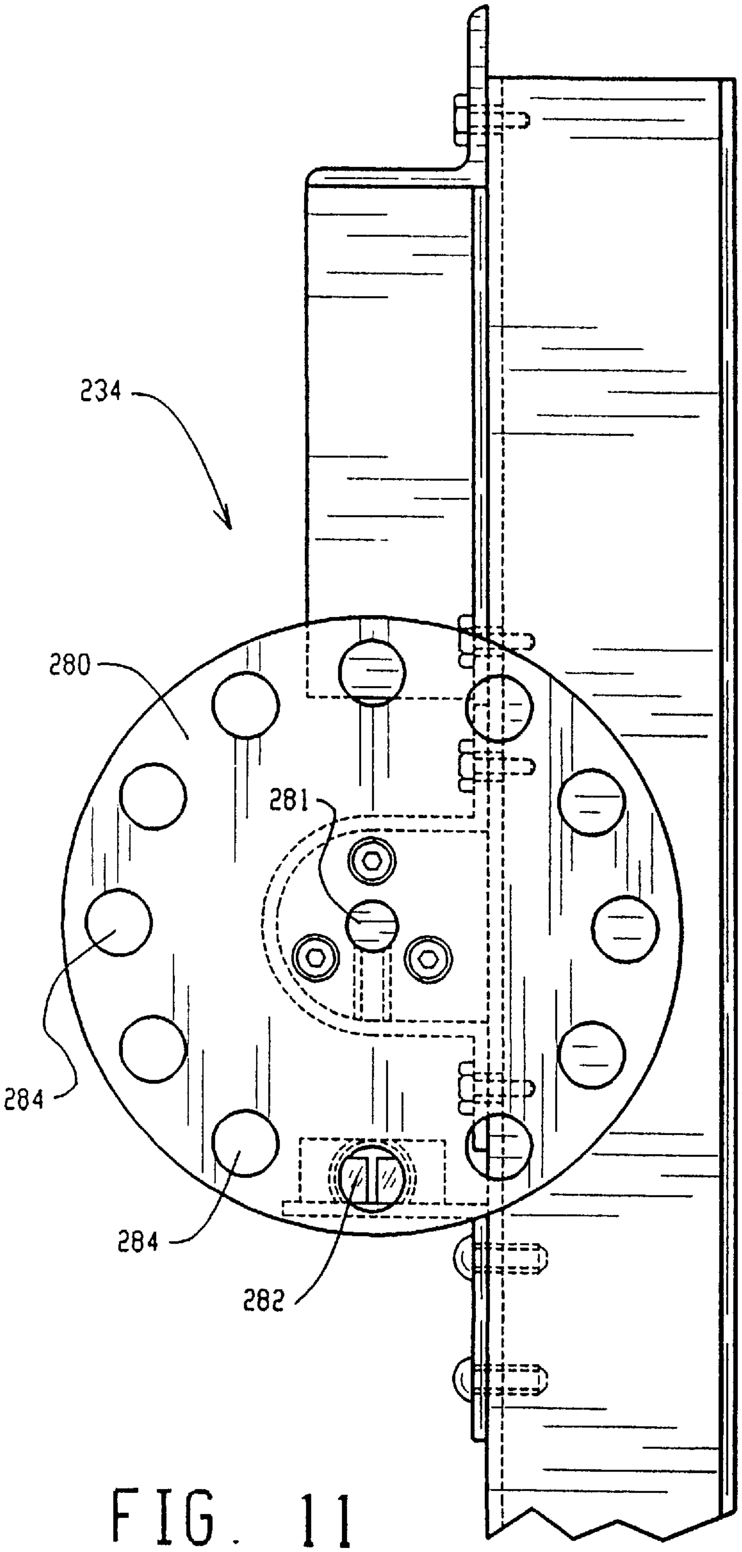
FIG. 11 is a side view of the length measuring device.

In instances where a customer is charged for usage of the machine based on the amount of paper used it may be desirable to provide a paper usage meter 232 in communication with the microprocessor 48. While it is possible for the microprocessor 48 to keep a running total of paper used by the machine in the non-volatile memory 230 by indirectly measuring the time that the feed motor is running as determined by the real time clock 228 and by multiplying that time by the paper speed, provided that the speed of the feed motor is known and constant, in some instances the paper usage may be more accurately determined by use of the paper usage meter 232. Such a meter may include a contact roller which rolls along the paper fed into the machine to directly measure the length of paper used or may be embodied through some other conventional means of measuring length. The paper usage, as well as other information stored in the non-volatile memory 230 may be made available for display when desirable on the display 54 as well as through the remote processor 218 as is described above.

Where it is desired to accurately determine the amount of dunnage product or padding produced by a machine, such as for billing purposes or when the length of the pad to be produced must closely fit within a container, the machine 10 may be provided with a length measuring device 234. An embodiment of a length measuring device is shown in FIGS. 10 and 11 and more fully described in co-owned U.S. patent application Ser. No. 08/155,116, which is incorporated in its entirety by this reference. The illustrated length measuring device 234 is positioned to monitor the angular movement of the gear assembly 22. The length measuring device 234 includes a rotating member 280 which is attached to the gear shaft 281 and a monitor 282 which monitors the angular motion of the member 280, and thus the gear shaft 281. Preferably, the rotating member 280 is a disk with a series of openings 284 arranged in equal circumferential increments. More preferably, the rotating member 280 is a black, nonreflective, aluminum disk with twelve openings. In this manner, each opening 284 will correspond to a 30° angular movement and, in the preferred embodiment, one inch of pad length.

The monitor 282 comprises a photo-optic transmitter/receiver 286 which transmits and receives light beams and a reflector 288 which reflects the transmitted light beams. The transmitter/receiver 286 is mounted on the machine frame and is positioned so that, as the rotating member 280 turns, transmitted light beams will travel through the openings 284. The photo-optic transmitter/receiver 286 preferably includes electrical circuitry capable of relaying interruptions in the receipt of light beams. The reflector 288 is mounted on the machine frame and is positioned to receive transmitted light beams which travel through the openings 284.

As the rotating member 280 turns, light beams transmitted by the transmitter/receiver 286 will pass through a first opening 284, contact the reflector 288, and reflect back to the transmitter/receiver 286. Once this opening 284 rotates out of alignment with the transmitter/receiver 286 (and the reflector 288), the receipt of reflected light beams by the transmitter/receiver 286 will be interrupted until the next opening 284 moves into alignment. Thus, with the preferred rotating member 280, twelve interruptions would occur for every revolution of the member 280, and thus for every revolution of the drive gear shaft 281.

The transmitter/receiver 286 relays the occurrence of an interruption to the processor 48 (FIG. 9) in the form of a pulse. The processor 48 uses this information to control the gear assembly 22 (i.e., to send activation/deactivation signals to the feed motor over the feed motor port 42) and thus uses this information to control pad lengths as well as to determine and store in the non-volatile memory 230 the total length of pad produced.

Figure 12:
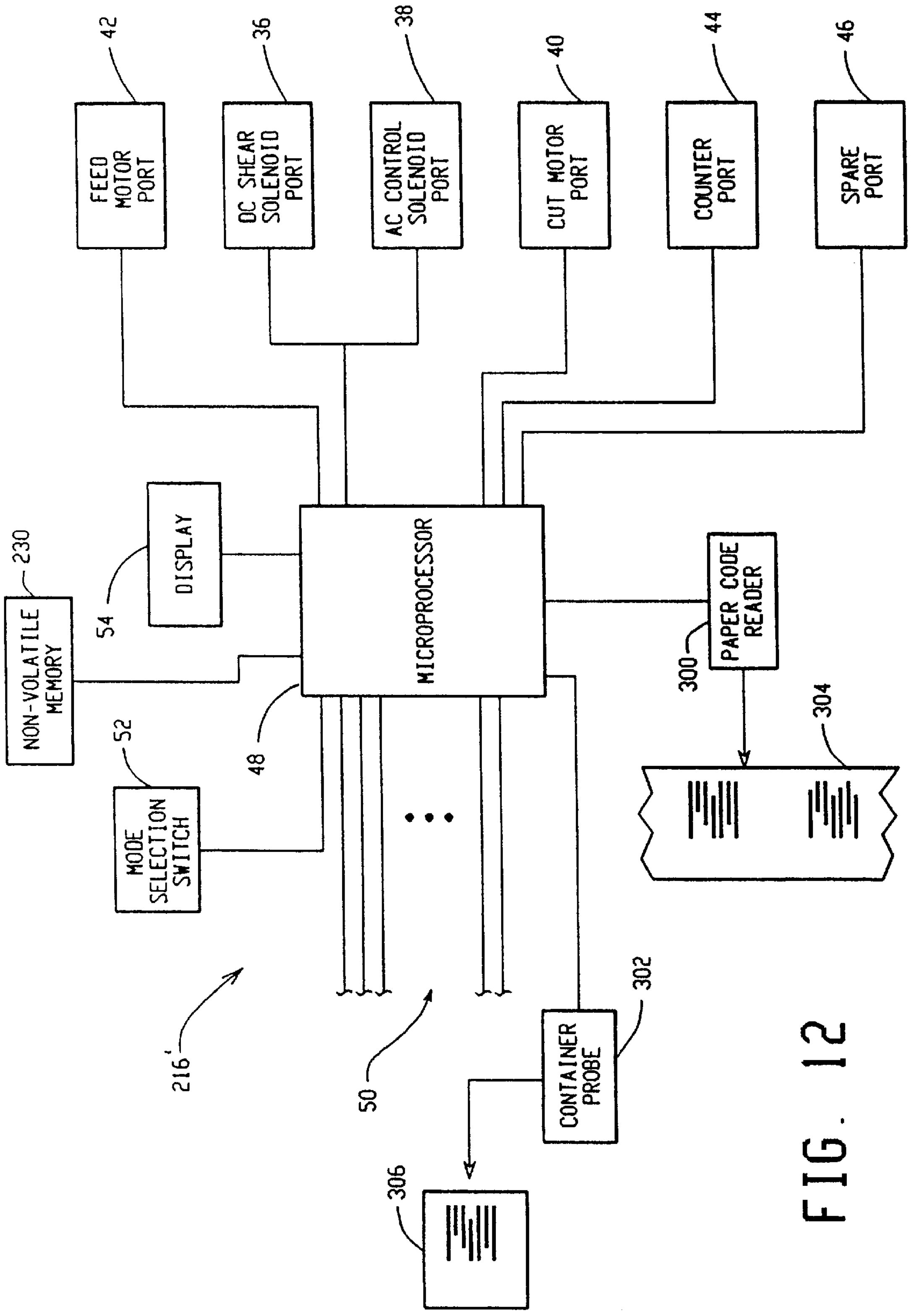
FIG. 12 is a block diagram of a controller including a code reader for reading information from stock paper and a container probe for determining packaging information from a container to which packaging is to be added.

Referring to FIG. 12, there is shown a controller 216' substantially the same as the controller 216 described above and including a paper code reader 300 and a container probe 302. While the controller 216' is illustrated with only the code reader 300 and container probe 302 and the non-volatile memory 230, the controller may also include the modem 220 for communication with a remote processor 218, the real-time clock 228, the paper usage meter 232 and the length measuring device 234 described with reference to FIG. 9. The paper code reader 300 and the container probe 302 may also be used separately or together.

The paper code reader 300 reads information encoded on the stock paper 304 as the paper is fed through the machine prior to the paper entering the conversion assembly 20 in order to identify or to verify the stock paper type, source or lot. Such information may aid the service person in diagnosing machine problems, such as problems which have occurred among machines using a particular paper lot, or may be used to determine information regarding the cushioning properties of a pad formed from such paper as may vary between, for example, single or multi-ply paper stock. The latter type of information may be of particular value where the machine 10 automatically determines and produces the amount of pad to adequately cushion a given container. The controller 216' may in some instances be adapted to produce pads only upon the verification of certain types of stock paper by the paper code reader 300, such as to as an example prevent damage to the machine 10 from the use of inappropriate stock paper material.

The paper code reader 300 is preferably a conventional bar code reader with the stock paper bearing an appropriate bar code encoded with the desired information. The paper code reader 300 can also be used to supply paper length information to the processor 48 when the bar codes are printed on the stock paper 302 at known spatial intervals or are encoded with length information. The paper code reader 300 may also be another type of information retrieval system including, for example, an optical code reader other than a bar code reader or a reader adapted to read or to detect the presence of encoded information using ultraviolet light.

Information detected from the paper stock 304 by the paper code reader 300 is transferred to the processor 48 where it may be acted upon and/or, as desired, stored for latter retrieval from the non-volatile memory 230. The number of rolls or amount of stock paper used from a particular source or the number of rolls or amount of stock paper used of a certain grade, thickness or ply are examples of useful information for storage in the non-volatile memory 230.

The container probe 302 may be embodied as a code reader such as a bar code reader which reads information from a container 306 for determining the amount of pad and the lengths of pads to produce to adequately cushion the container. In such an instance a bar code would be printed on or otherwise affixed to the container 306 or to a packaging invoice supplied with the container and the bar code reader would be positioned to read the bar code as the container is conveyed to or the bar code is placed at a known position relative to the machine 10. Upon reading the information from the bar code, the container probe 302 will transfer the information to the processor 48 which may use the information to instruct the machine 10 to produce the required number and lengths of pads as determined by a look-up table or as directly encoded into the bar code. The operator would then take the pads automatically produced by the machine 10 and place them in the container 306 without further interaction between the operator and the machine.

The container probe 302 may also be in the form of probe which actually measures the void volume of the container. Such a probe may include a mechanical probe such as a plunger, an air cylinder or other low pressure probe which probes the container 306 to determine the volume of padding necessary to fill the container. A mechanical probe may probe the container 306 in one or in multiple locations to determine the amount of pad needed. The mechanical probe may also be used in conjunction with a bar code reader or used in conjunction with or supplanted with sensors which sense the dimensions or degree of fill of the container 306 including optical and ultrasonic sensors and sensor using other forms of machine vision or pattern recognition.

Figure 13:
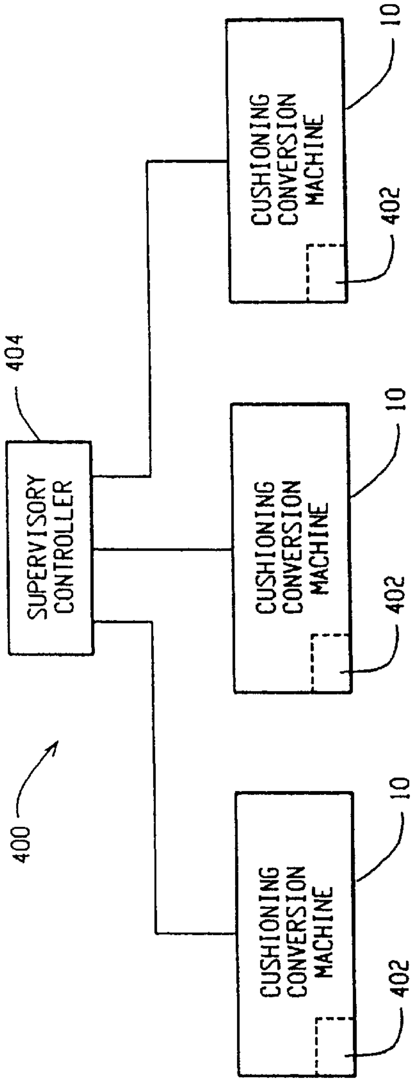
FIG. 13 is a block diagram of a fault tolerant cushioning producing network.

A fault tolerant cushioning producing network 400 is illustrated schematically in FIG. 13. Such a network 400 would typically include a number of cushioning conversion machines 10 each preferably having a controller 402 such as the controllers 16, 216 and 216' described above for controlling the pad producing and diagnostic functions of the machine. The individual machines 10 would also be controlled by a supervisory controller 404 which may be a devoted supervisory controller implemented in a personal computer or similar processor or may be resident in a cushioning conversion machine in which case it would control its host machine as well as provide supervisory control functions to its host machine and the other machines in the network 400. The supervisory controller 404 may communicate with controllers 402 of each machine 10 in a conventional "master-slave" mode or the controllers may communicate with each other in a conventional "peer-to-peer" mode depending on the level of intercommunication between the machines 10 that is desired and whether it is desired to employ a master supervisory controller.

When the network 400 is operating in the master-slave mode, individual or plural machines 10 are instructed by the supervisory controller 404 to produce pads of the desired number and lengths. The supervisory controller 404 can divide up the work load among the different machines according to work schedules and maintenance schedules of the machines and can bypass or reallocate work from a machine which has informed the supervisory controller of a fault condition, such as a paper jam, or that the machine has run out of paper stock. The machines may also communicate information and fault conditions with each other. While it is preferable that each machine 10 is provided with a separate controller 402, a machine may be controlled through the supervisory controller 404 without the need of an individual controller for each machine.

Figure 14:
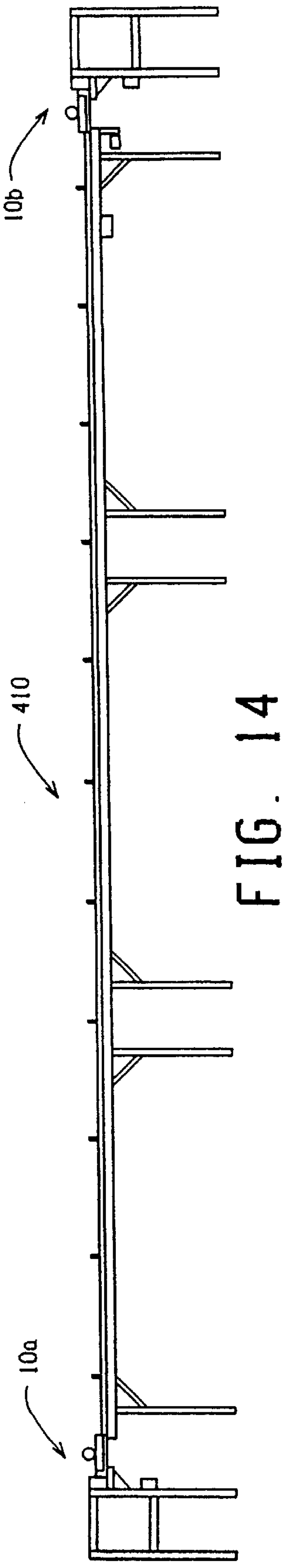
FIG. 14 is an illustration of two cushion producing machines positioned at either end of a conveyor and communicating via a network.

When the network 400 is operating in the peer-to-peer mode, a primary or first machine is active producing pads while the remaining machine or machines are inactive. If the first machine fails, the remaining machine or machines can automatically take over for the first machine. Such a network could be implemented between two machines 10*a* and 10*b* at either end of a reversible conveyor system 410, as shown in FIG. 14. In this case, in normal operation one machine is active while the other machine is idle. The active machine, say machine 10*a*, produces pads of the desired length and deposits the pads onto the conveyor system 410 which carries the pad away from the active machine 10*a* and to an operator. If the machine 10*a* becomes inoperable, such as due to a jam or lack of paper for instance, or a switch is desired at a scheduled intervals, the machine 10*a* becomes inactive and the machine 10*b* takes over the pad producing functions. At this time the direction of the conveyor system 410 would also reverse direction to carry pads produced by the machine 10*b* away from that machine and to an operator.

While a number of controllers have been described above relative to a number of specific cushioning conversion machines, it will be readily apparent that the controllers of the present invention have a wide range of applications in controlling the operation of many types or configurations of cushioning conversion machines. The versatility and structure of the controllers as well as the provision of spare controller ports also permits customization of controller functions for different machine applications and control of accessory devices.

What is claimed is:

1. A diagnostic system for performing real time diagnostics on a cushioning conversion machine, the system comprising:

a machine resident controller for controlling and monitoring operation of the cushioning conversion machine;

a remote processor for performing diagnostic functions based on information retrieved from a cushioning conversion machine; and, a communication device for facilitating real time communication between the machine resident controller and the remote processor.

2. The diagnostic system of claim 1, further including memory directly accessible by the machine resident controller.

3. The diagnostic system of claim 2, wherein the memory is accessible by the remote processor through the machine resident controller.

4. A cushioning conversion machine, comprising:

conversion assemblies, including a feed assembly, which convert a stock material into a three-dimensional cushioning product;

a resident controller for controlling and monitoring operation of the conversion assemblies;

a real time diagnostic device which monitors the operation of the conversion assemblies, the diagnostic device including:

a processing device which determines machine status of the machine and generates signals in accordance with such machine status;

a communication device which communicates in real time the machine status to a remote processor.

5. A method of making cushioning product, said method comprising the steps of:

supplying a stock material;

providing a cushioning conversion machine including conversion assemblies for converting stock material into a three-dimensional strip of dunnage;

using the cushioning conversion machine to convert the stock material into a three-dimensional strip of dunnage;

monitoring the operational status of the machine;

generating signals in accordance with such status; and communicating the generated signals in real time to a remote processor.

6. A method as set forth in claim 5 wherein the conversion assemblies may be operated in a plurality of operational modes and wherein the generating step comprises generating signals in accordance with the selected mode of operation.

7. A method as set forth in claim 5 wherein the communicating step comprises transmitting the generated signals to a personal computer.

8. A method as set forth in claim 5 wherein said communicating step comprises automatically transmitting the generated signals to the remote processor.

9. A method as set forth in claim 5 wherein the communicating step is performed while the conversion assemblies are active.

10. A method as set forth in claim 5 wherein the supplying step comprises supplying stock material that is biodegradable, recyclable and reusable.

11. A method as set forth in claim 5 wherein the supplying step comprises supplying stock material that is Kraft paper.

12. A method as set forth in claim 5 wherein the supplying step comprises supplying stock material that comprises multiple plies of Kraft paper.

13. A method as set forth in claim 5 wherein the supplying step comprises supplying stock material that comprises a roll of superimposed plies of Kraft paper.

14. A method as set forth in claim 5 wherein the supplying step comprises supplying stock material that comprises a roll of one or more plies of Kraft paper approximately thirty inches wide.

15. A diagnostic system for performing real time diagnostics at a remote service station on a cushioning conversion machine at a packaging site, the system comprising:

a machine resident controller, resident in the cushioning conversion machine, for controlling and monitoring operation of the machine;

a remote processor, at the remote service station, for performing diagnostic functions based on information retrieved from the cushioning conversion machine; and, a communication device for facilitating real time communication between the machine resident controller and the remote processor whereby skilled personnel at the remote service station may perform real time diagnosis on the cushioning conversion machine at the packaging site.

16. In combination, a cushioning conversion machine at a packaging site and a diagnostic system for performing real time diagnostics on the cushioning conversion machine at a remote service station; the combination comprising:

conversion assemblies which convert a sheet-like stock material into a three-dimensional cushioning product;

a resident controller, resident in the cushioning conversion machine, for controlling and monitoring operation of the conversion assemblies;

a processing device which determines the status of the conversion assemblies and which generates signals in accordance with such status;

a remote processor at a remote service station; and a communication device for communicating in real time the status of the conversion assemblies to the remote processor whereby a skilled personnel at the remote service station may perform real time diagnostics on the cushioning conversion machine.

17. A combination as set forth in claim 16 wherein the conversion assemblies include a forming assembly which forms the sheet-like stock material into a strip and a feeding assembly which advances the sheet-like stock material through the forming assembly.

18. A method of making cushioning product, said method comprising the steps of:

providing, at a packaging site, a cushioning conversion machine including conversion assemblies for converting sheet-like stock material into a three-dimensional strip of dunnage;

activating the conversion assemblies to convert sheet-like stock material into a three-dimensional strip of dunnage at the packaging site;

monitoring the operational status of the conversion assemblies at the packaging site;

generating signals in accordance with such status at the packaging site; and communicating the generated signals in real time to a remote processor at a remote service station whereby a skilled personnel at the remote service station may perform real time diagnostics on the cushioning conversion machine.

19. A method as set forth in claim 18 wherein the conversion assemblies may be operated in a plurality of modes of operation and wherein the generating step comprises generating signals in accordance with the selected mode of operation.

20. A method as set forth in claim 18 wherein the communicating step comprises transmitting the generated signals to a personal computer at the remote service station.

21. A method as set forth in claim 18 wherein said communicating step comprises automatically transmitting the generated signals to the remote processor at the remote service station.

22. A method as set forth in claim 18 wherein the communicating step is performed while the conversion assemblies are active.

23. A method as set forth in claim 18 further comprising the step of supplying sheet-like stock material to the conversion assemblies that is biodegradable, recyclable and reusable.

24. A method as set forth in claim 23 wherein the supplying step comprises supplying sheet-like stock material that is Kraft paper.

25. A method as set forth in claim 24 wherein the supplying step comprises supplying sheet-like stock material that comprises multiple plies of Kraft paper.

26. A method as set forth in claim 25 wherein the supplying step comprises supplying sheet-like stock material that comprises a roll of superimposed plies of Kraft paper.

27. A method as set forth in claim 24 wherein the supplying step comprises supplying a roll of one or more plies of Kraft paper that is approximately thirty inches wide.

* * * * *